(12) United States Patent
Ohta et al.

(10) Patent No.: US 7,531,800 B2
(45) Date of Patent: May 12, 2009

(54) INFRARED DETECTION ELEMENT

(75) Inventors: Yoshimi Ohta, Yokohama (JP); Masaki Hirota, Zushi (JP)

(73) Assignee: Nissan Motor Co., Ltd., Yokohama (JP)

( * ) Notice: Subject to any disclaimer, the term of this patent is extended or adjusted under 35 U.S.C. 154(b) by 106 days.

(21) Appl. No.: 11/651,054

(22) Filed: Jan. 9, 2007

(65) Prior Publication Data

US 2007/0158570 A1   Jul. 12, 2007

(30) Foreign Application Priority Data

Jan. 12, 2006   (JP) .............................. 2006-004401

(51) Int. Cl.
*G01J 5/00*   (2006.01)
(52) U.S. Cl. .................................. 250/338.1
(58) Field of Classification Search ............... 250/338.1
See application file for complete search history.

(56) References Cited

U.S. PATENT DOCUMENTS 5,583,058 A * 12/1996 Utsumi et al. ............. 250/338.4

2004/0232337 A1 * 11/2004 Vilain ..................... 250/338.1

FOREIGN PATENT DOCUMENTS

JP   2001-281065   10/2001

* cited by examiner

*Primary Examiner*—David P Porta
*Assistant Examiner*—Shun Lee
(74) *Attorney, Agent, or Firm*—Global IP Counselors, LLP

(57) ABSTRACT

An infrared detection element is configured to prevent decreases in detection precision when a beam bends. The infrared detection element basically has a substrate structure, a light receiver configured and arranged to receive infrared rays and at least one beam having one end fixed to the substrate and another end fixed to the light receiver to support the light receiver above the substrate. At least one protuberance is provided on at least one of the substrate, the light receiver and the beam with the at least one protuberance being configured and arranged to limit direct contact between any two of the beam, the light receiver and the substrate structure during bending of the beam, except at the at least one protuberance.

13 Claims, 25 Drawing Sheets

INFRARED DETECTION ELEMENT

CROSS-REFERENCE TO RELATED APPLICATIONS

This application claims priority to Japanese Patent Application No. 2006-004401, filed on Jan. 12, 2006. The entire disclosure of Japanese Patent Application No. 2006-004401 is hereby incorporated herein by reference.

BACKGROUND OF THE INVENTION

1. Field of the Invention

The present invention generally relates to an infrared detection element. More specifically, the present invention relates to an infrared detection element that is configured to prevent decreases in detection precision when a beam bends.

2. Background Information

Thermal infrared detection elements are known in which a light receiver on which an infrared ray absorption band is formed is supported on a hollow substrate by a very small beam, and the temperature of the light receiver is detected by a thermopile or the like (for example, see Unexamined Patent Application Publication No. 2001-281065).

In view of the above, it will be apparent to those skilled in the art from this disclosure that there exists a need for an improved infrared detection element. This invention addresses this need in the art as well as other needs, which will become apparent to those skilled in the art from this disclosure.

SUMMARY OF THE INVENTION

It has been discovered that in thermal infrared detection elements of the above description, a risk arises that the beam will bend and the light receiver or beam will come into contact with the substrate when the detection element is subjected to impact or force, increased speed, or the like. In particular, when the beam is severely bent, a problem arises in that a twisting force is also applied, the light receiver or beam is brought into linear contact with the substrate, and heat dissipates from the light receiver toward the substrate, causing the detection precision to decrease.

In view of the foregoing problems, the present invention provides an infrared detection element that basically comprises a substrate structure, a light receiver configured and arranged to receive infrared rays and at least one beam having one end fixed to the substrate and another end fixed to the light receiver to support the light receiver above the substrate. At least one protuberance is provided on at least one of the substrate, the light receiver and the beam with the at least one protuberance being configured and arranged to limit direct contact between any two of the beam, the light receiver and the substrate structure during bending of the beam, except at the at least one protuberance.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1A:
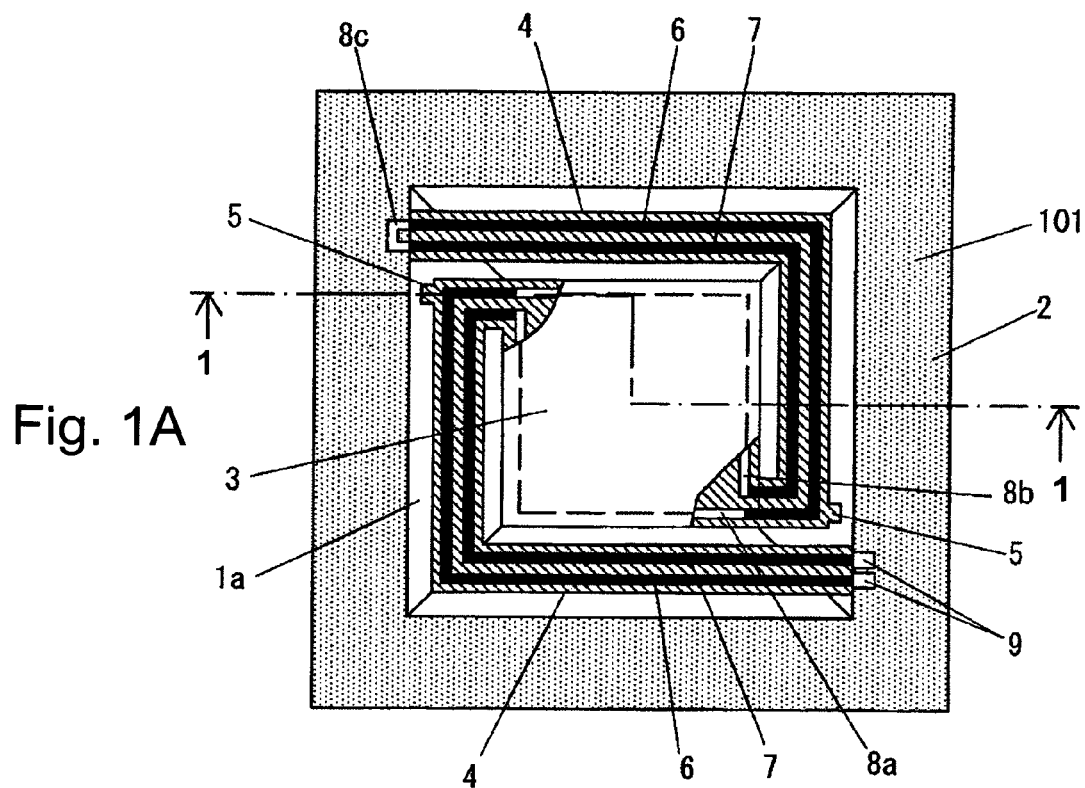
FIG. 1A is a simplified top plan view of an infrared detection element in accordance with a first embodiment of the present invention.

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents. In view of the following embodiments, the parts of the embodiment that are identical to the parts will be given the same reference numerals.

Figure 1B:
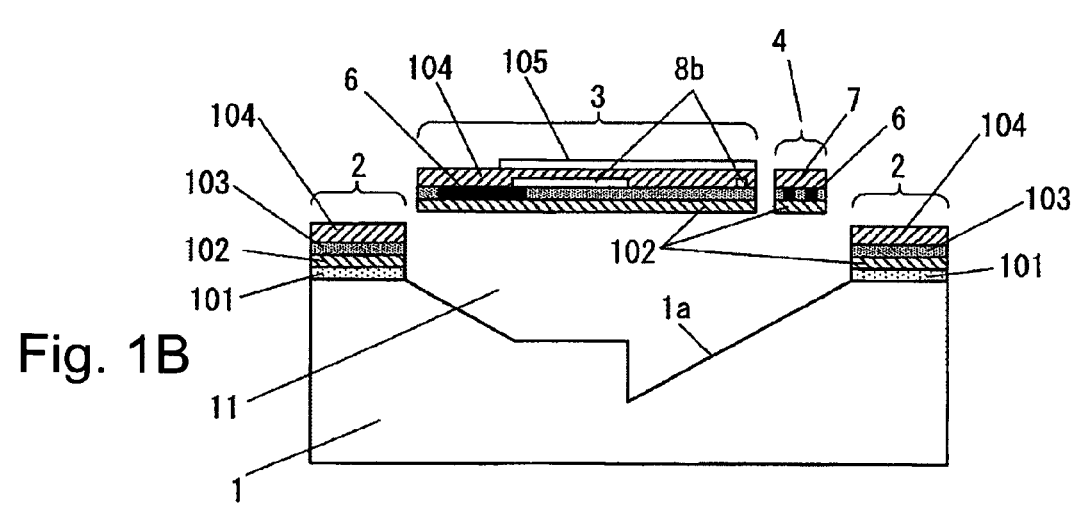
FIG. 1B is a simplified cross-sectional view of the infrared detection element illustrated in FIG. 1 as seen along section line 1-1 in FIG. 1A.

Referring initially to FIGS. 1A and 1B, an infrared detection element is illustrated in accordance with a first embodiment of the present invention. FIG. 1A is a simplified top plan view of the infrared detection element, while FIG. 1B is a simplified cross-sectional view of the infrared detection element. Basically, the infrared detection element of the illustrated embodiment includes a silicon (Si) substrate 1, a frame 2, a light receiver 3 and a pair of substantially L-shaped beams 4 supporting the light receiver 3 on the frame 2. Thus, an end of each of the beams 4 is connected to the frame 2, while the other end of each of the beams 4 is connected to the light receiver 3. In FIG. 1A, a portion of the light receiver 3 and the beams 4 are shown in section in order to better understand the inner structure of the light receiver 3 and the beams 4. The silicon (Si) substrate 1 and the frame form a substrate structure that supports the light receiver 3 by the beams 4.

A concavity 1a is etched into the substrate 1. The light receiver 3 and the beams 4 are located along an upper part of the concavity 1a. The concavity 1a can also be a through hole. Thus, the concavity can also be referred to as a substrate space that generically refers to both a concavity and a through hole. Also a cavity 11 is formed in the substrate 1 to form a space between the light receiver 3 and the substrate 1 and a space between the beams 4 and the substrate 1.

As seen in FIG. 1B, the frame 2, the light receiver 3, and the beams 4 are formed of a multi-layer film that comprises an insulating film 102 made from a silicon nitride (SiN) film, an interlayer insulating film 103, and a protecting film 104. An infrared-absorbing film or member 105 is formed on the protecting film 104 of the light receiver 3. An etching stopper layer 101 is formed between the insulating layer 102 in the frame 2 and the substrate 1. The etching stopper layer 101 functions as an etching stopper when the substrate 1 is etched to form the cavity 11.

P-polysilicon 6 and N-polysilicon 7 that constitute thermopiles are formed on the beams 4, respectively. The P-polysilicon 6 of one of the beams 4 is connected to the N-polysilicon 7 of the other one of the beams 4 by an aluminum wire 8a. Also the N-polysilicon 7 of one of the beams 4 is connected to the P-polysilicon 6 of the other one of the beam 4 by an aluminum wire 8b. The P-polysilicon 6 of one of the beams 4 is connected by an aluminum wire 8c to another end of the N-polysilicon 7. A connector 9 is formed on another end of the N-polysilicon 7 and on the P-polysilicon 6 that is formed one on of the beams 4, and a detection circuit (not shown) is connected to the connector 9.

The serially connected pair of P-polysilicon 6 and N-polysilicon 7 thus forms a single thermocouple. A thermopile is formed by serially connecting two thermocouples in the order PNPN. In a thermopile, a greater output voltage can be obtained because the electromotive forces of the individual thermocouples are added together. As shown in FIG. 1B, in the infrared detection element of the illustrated embodiment, the light receiver 3 and the beams 4 are formed higher in the drawing than the surface of the substrate 1. A structure is provided whereby protuberances 5 that protrude toward the frame 2 are additionally formed on each of the beams 4, and portions having these protuberances 5 make contact with the substrate 1 first when the light receiver 3 and the beams 4 are displaced toward the substrate 1. For this reason, the protuberances 5 are preferably formed at positions where displacement is most likely to occur.

When infrared rays impinge on the light receiver 3, they are absorbed by an infrared-absorbing film 105 (e.g., a film including a metal compound or the like) that is formed on the upper surface of the light receiver 3, and the energy of the infrared ray is converted to thermal energy. As a result, the temperature of the light receiver 3 increases. The light receiver-side of the thermopile serves as a hot junction, while the connector on the side of the frame 2 serves as a cold junction. The thermo-electromotive force proportional to the difference in temperature is created through the Seebeck effect. The infrared rays can be detected by removing the electromotive force from the connector 9 to the exterior as an infrared ray detection signal.

In such a thermal infrared detection element, thermally isolating the light receiver 3 results in improved sensitivity. Therefore, the cross-sectional area of the beams 4 is reduced while the length of the beams 4 is increased so that the heat resistance of the beams 4 increases. For example, when the length of a side of the frame 2 is set at 100 μm, the width of the beams 4 is about 5 μm and the thickness is about 2 μm. For this reason, the beams 4 are readily bent when the infrared detection element is subjected to a force or accelerated. Thus, the light receiver 3 and the beams 4 readily move in a vertical direction shown in FIG. 1B.

Figure 2:
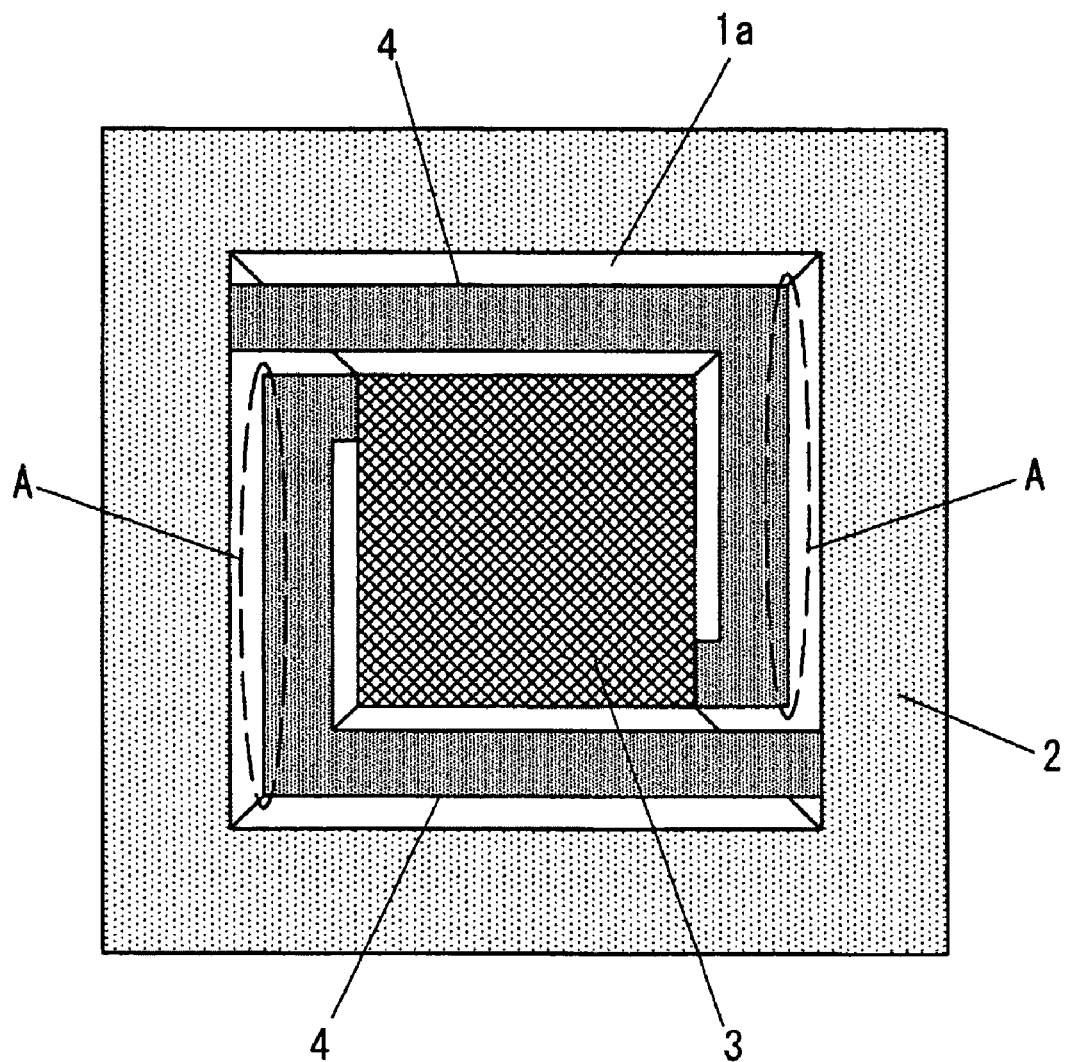
FIG. 2 is a simplified top plan view of an infrared detection element for describing an infrared detection element that does not include a protuberance.

Therefore, in an infrared detection element in which a protuberance 5 is not formed (see FIG. 2), such as in the prior art, the outside surface of the beams 4 indicated by the symbol A in FIG. 2 readily makes linear contact with the substrate structure (e.g., substrate 1 and/or frame 2) when the beams 4 are displaced toward the substrate 1 (into the page in FIG. 2). As a result, a problem is presented in that the thermal energy of the light receiver 3 dissipates from the light receiver 3 toward the substrate 1 via the contacting portion. As a result of which, the temperature of the light receiver 3 decreases and the temperature detection precision of the thermopile decreases.

However, the protuberances 5 are formed on the beams 4 in the present invention. Therefore, the protuberances 5 make contact with the substrate structure (e.g., substrate 1 and/or frame 2) when displacement occurs, downward movement is hindered, and the light receiver 3 and main bodies of the beams 4 can be prevented from making contact with the substrate structure (e.g., substrate 1 and/or frame 2). The area of contact between the protuberances 5 and the substrate structure (e.g., substrate 1 and/or frame 2) is reduced, and a substantially point-type contact can be obtained. As a result, when contact is made, transmission of heat from the light receiver 3 to the substrate 1 can substantially be prevented, and decreases in the temperature detection precision of the thermopile can also be prevented. In addition, when the protuberances 5 come into contact with the concavity 1, considerable bending of the beams 4 can be minimized, and damage to the beams 4 due to excessive deformation can be prevented.

In the illustrated embodiment, the light receiver 3 and the beams 4 are disposed higher in the drawing (the thickness direction of the substrate 1) than the surface of the substrate 1, as shown in FIG. 1B. For this reason, when the light receiver 3 and the beams 4 are displaced toward the substrate 1, the allowable displacement before contact is made with the substrate structure (e.g., substrate 1 and/or frame 2) can be made larger than in the prior art, and the likelihood of contact can be reduced. In the illustrated embodiment, the light receiver 3 and the beams 4 are disposed above the substrate 1. However, these members can be located at the same height.

Figure 3A:
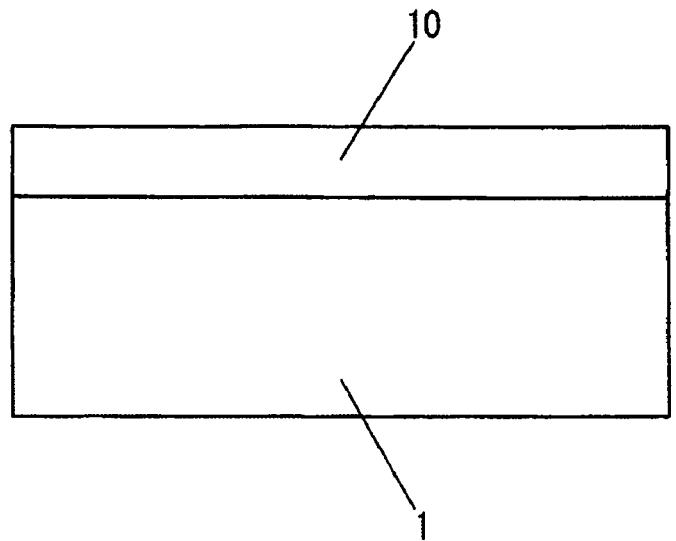
FIG. 3A is a simplified side elevational view showing a first step in manufacturing the infrared detection element of the present invention.
Figure 3B:
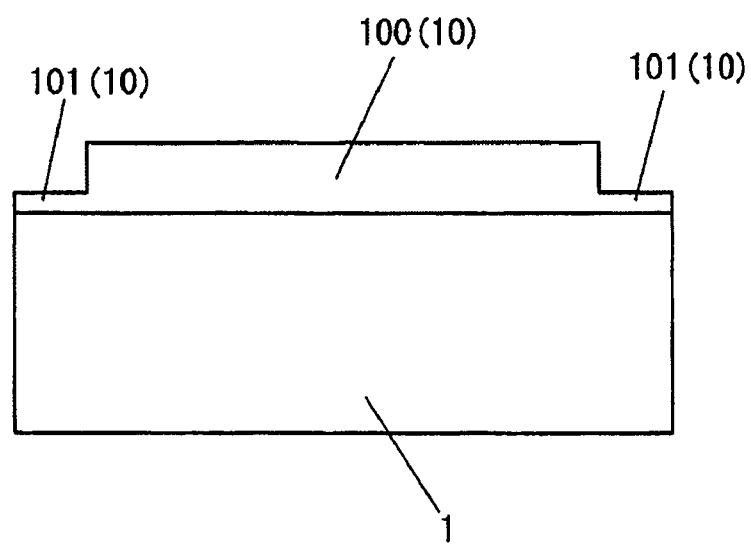
FIG. 3B is a simplified side elevational view showing a second step in manufacturing the infrared detection element of the present invention.

A method for manufacturing the infrared detection element shown in FIG. 1 shall next be described. First, a polysilicon layer 10 is formed on the surface of the silicon substrate 1 by CVD or another method, as shown in FIG. 3A. The silicon substrate 1 is formed so that a surface of the substrate has a (100) plane orientation and the polysilicon layer 10 is formed in the (100) plane. A peripheral portion of the rectangular polysilicon layer 10 formed on the substrate 1 is then etched into a stepped pattern to form a step 101 in the shape of a rectangular frame, as shown in FIG. 3B. A portion of the step 101 is used as an etching stopper, while the inside rectangular portion 100 is used as an etching sacrifice layer. The etching stopper 101 and the etching sacrifice layer 100 are described hereunder.

Figure 4A:
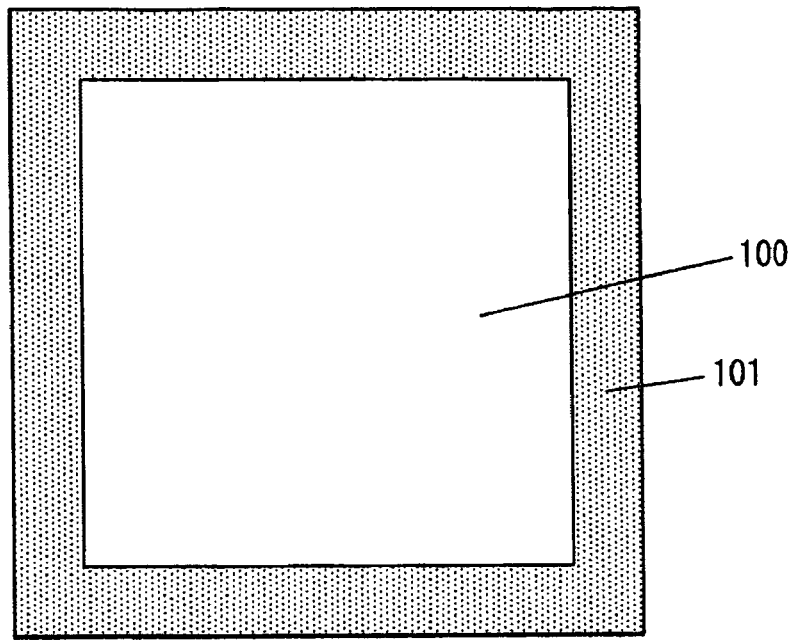
FIG. 4A is a simplified top plan view showing a third step in manufacturing the infrared detection element of the present invention.

In the step shown in FIG. 4, the etching stopper 101 is formed by the ion implantation of boron into the polysilicon layer 101 provided so as to surround the periphery of the etching sacrifice layer 100. In the next step, which is shown in FIG. 5, a silicon nitride (SiN) film is formed as an insulating film 102 on the etching sacrifice layer 100 and the etching stopper 101 by LPCVD (low-pressure chemical vapor deposition) or the like. The P-polysilicon 6 and the N-polysilicon 7 are each formed on the insulating film 102.

Figures 5A, 5B, 5C:
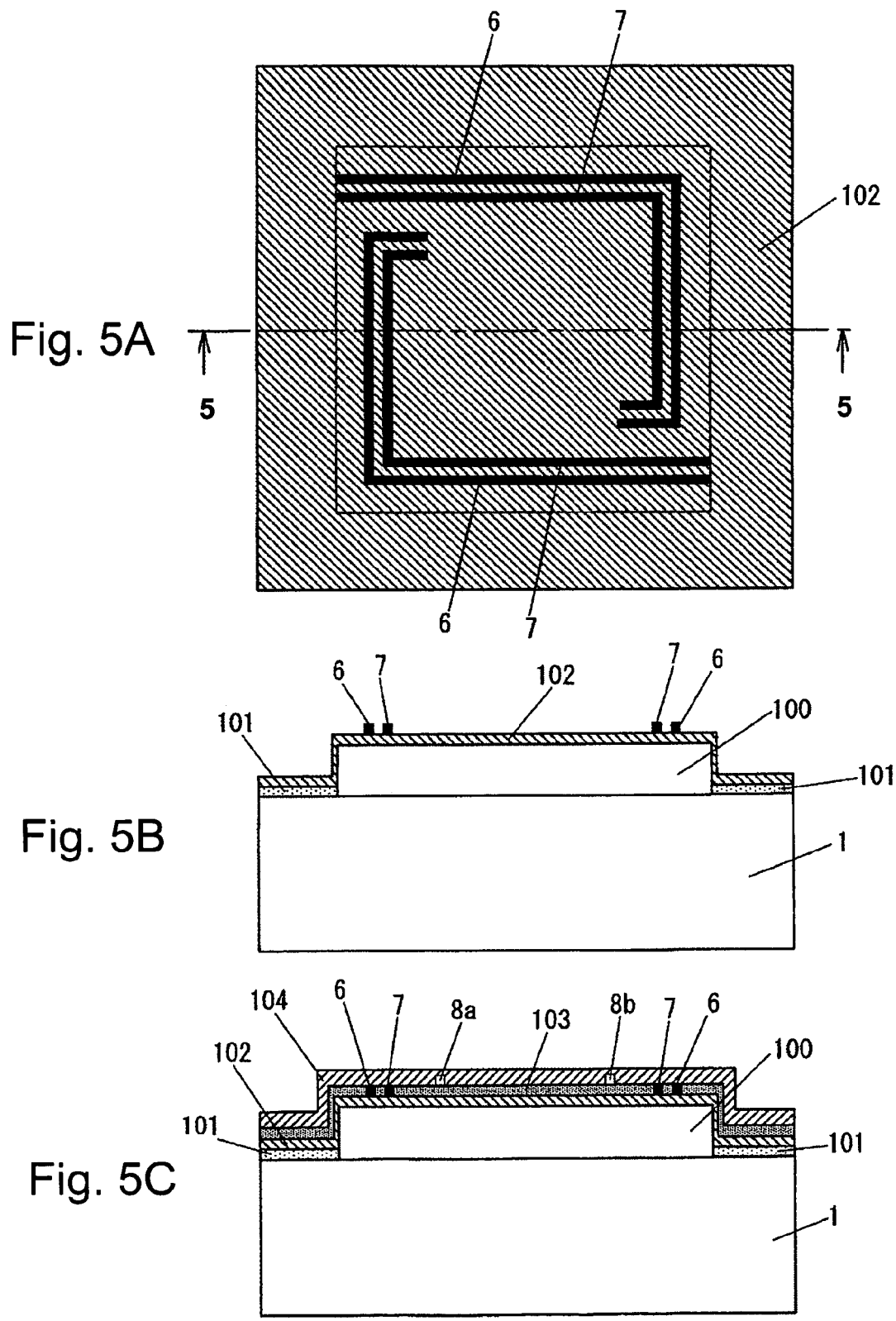
FIG. 5A is a simplified top plan view showing a fourth step in manufacturing the infrared detection element of the present invention.
FIG. 5B is a simplified cross-sectional view showing the fourth step in manufacturing the infrared detection element of the present invention as seen along section line 5-5 in FIG. 5A.
FIG. 5C is a simplified cross-sectional view showing a fifth step in manufacturing the infrared detection element of the present invention as seen along section line 5-5 in FIG. 5A.

For example, a polysilicon film is formed over the entire surface of the insulating layer 102, the N-polysilicon is formed by the ion implantation of phosphorus (P) or arsenic (As) into the polysilicon layer, and the P-polysilicon is formed by the ion implantation of boron (B) into the polysilicon layer. These layers are then patterned through etching, thereby forming the P-polysilicon 6 and the N-polysilicon 7 in shapes such as those shown in FIG. 5A. An intermediate insulating film 103 composed of a silicon oxide film or the like is next formed, as shown in FIG. 5C. The aluminum wires 8a to 8c and the connector 9 (not shown) are formed. Now a protecting film 104 composed of a silicon oxide film or the like is subsequently formed over the entire surface.

Figure 6A:
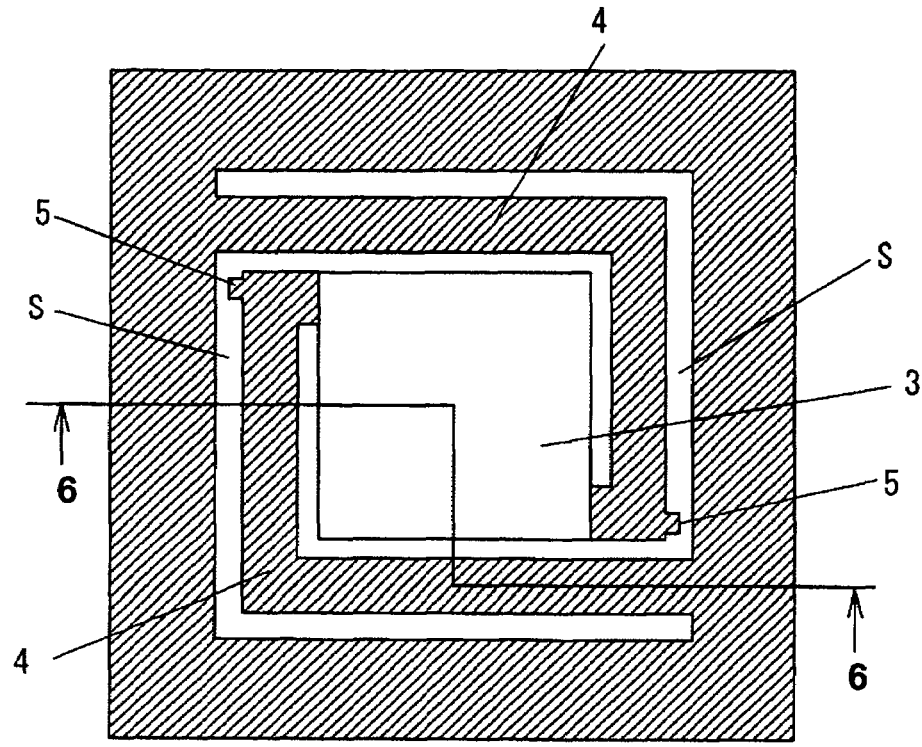
FIG. 6A is a simplified top plan view showing a sixth step in manufacturing the infrared detection element of the present invention.
Figure 6B:
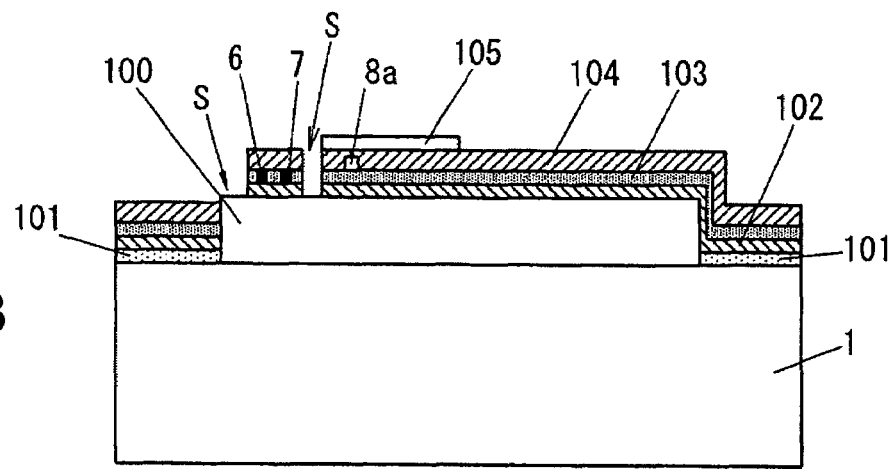
FIG. 6B is a simplified cross-sectional view showing the sixth step in manufacturing the infrared detection element of the present invention as seen along section line 6-6 in FIG. 6A.
Figure 7A:
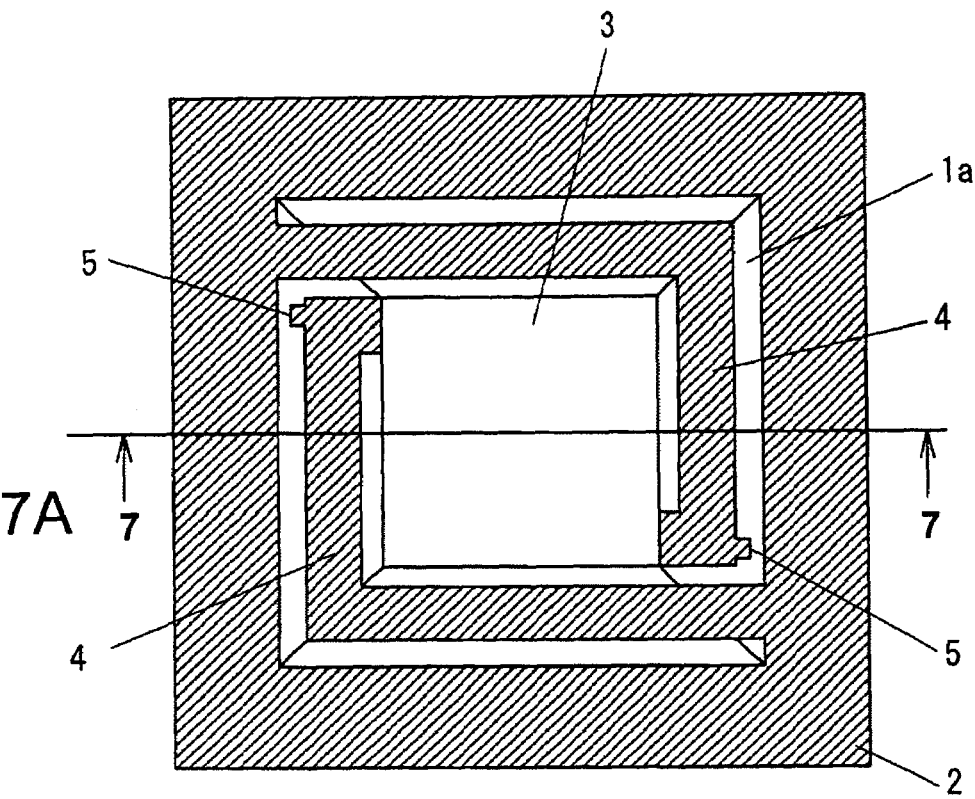
FIG. 7A is a simplified top plan view showing a seventh step in manufacturing the infrared detection element of the present invention.
Figure 7B:
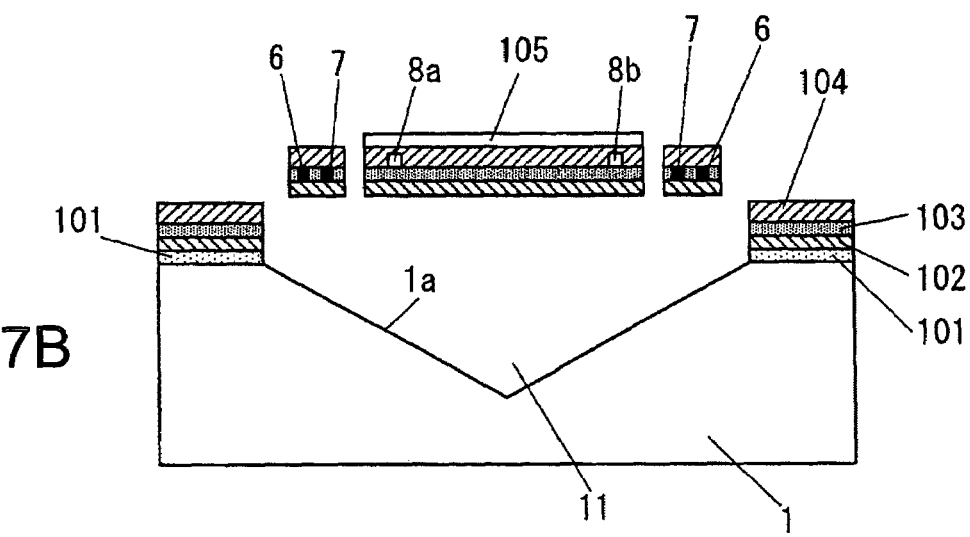
FIG. 7B is a simplified cross-sectional view showing the seventh step in manufacturing the infrared detection element of the present invention as seen along section line 7-7 in FIG. 7A.

In the step shown in FIG. 6, an infrared-absorbing film 105 is formed on the protecting film 104 of the light receiver 3, and an etching slit S is formed by anisotropic etching using plasma etching or the like. In the step shown in FIG. 7, the polysilicon etching sacrifice layer 100 and the silicon substrate 1 are anisotropically etched from the etching slit S using hydrazine (anisotropic etching liquid). Etching stops at the etching stopper 101, and the concavity 1a is formed on the substrate 1. The surface of the substrate 1 is aligned with the (100) plane, and is therefore etched to a pyramidal shape by crystalline anisotropic etching. The surface of the concavity 1a is aligned with the (111) plane of the silicon single crystal. The infrared detection element shown in FIG. 1 is formed according to these steps.

Figure 8:
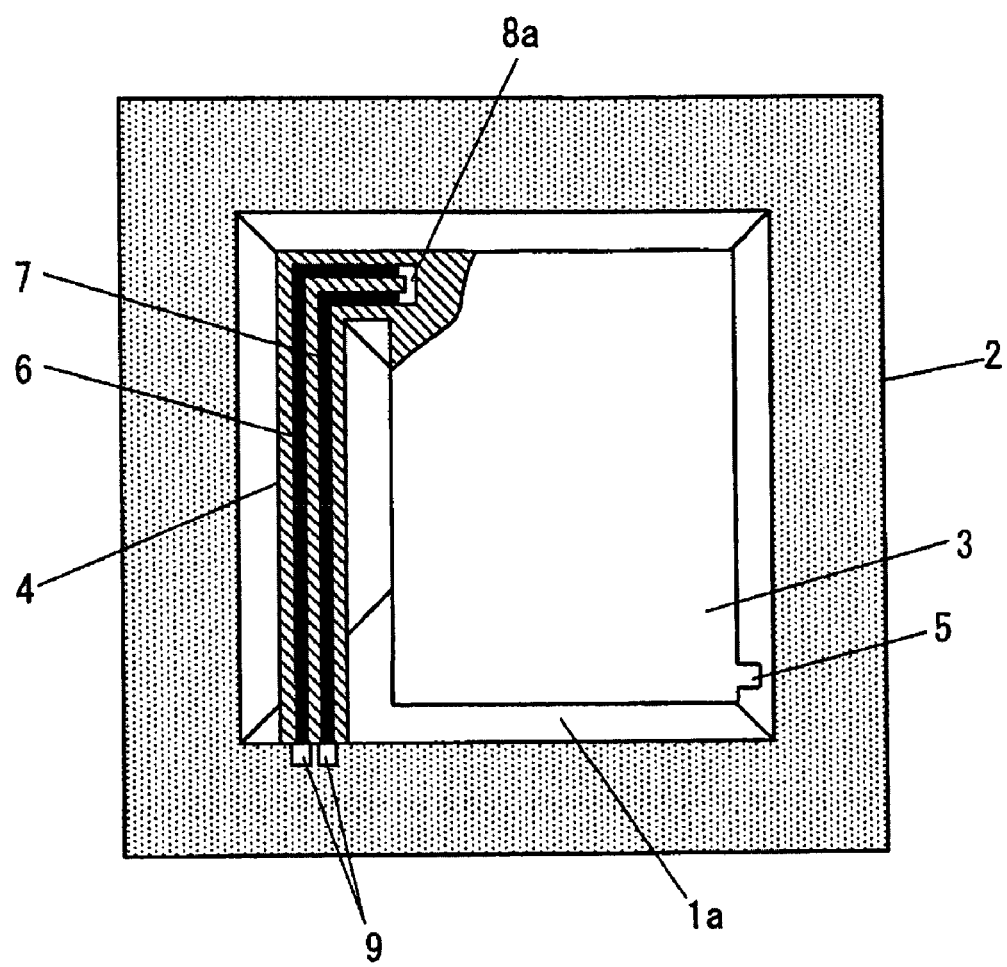
FIG. 8 is a simplified top plan view of an infrared detection element in accordance with a first modification of the present invention.

FIG. 8 is a simplified top plan view of an infrared detection element in accordance with a first modification of the present invention. In the embodiment described above, a configuration was employed in which the light receiver 3 was supported by the beams 4. However, in the first modification, a structure is employed in which the light receiver 3 is supported on one side by a single beam 4. In this instance, the position where displacement is greatest is to the right of and below the light receiver 3, which is a position on the light receiver 3 that is furthest from where the beam 4 and light receiver 3 make contact. For this reason, a protuberance 5 is formed on this position on the light receiver 3. The contacting area can thereby be kept to a minimum when the light receiver 3 is displaced toward the substrate structure (e.g., substrate 1 and/or frame 2), and the detection precision can be prevented from decreasing. The manufacturing steps are the same as that of the infrared detection element of the first embodiment described above, and a description thereof is accordingly omitted.

Figure 9:
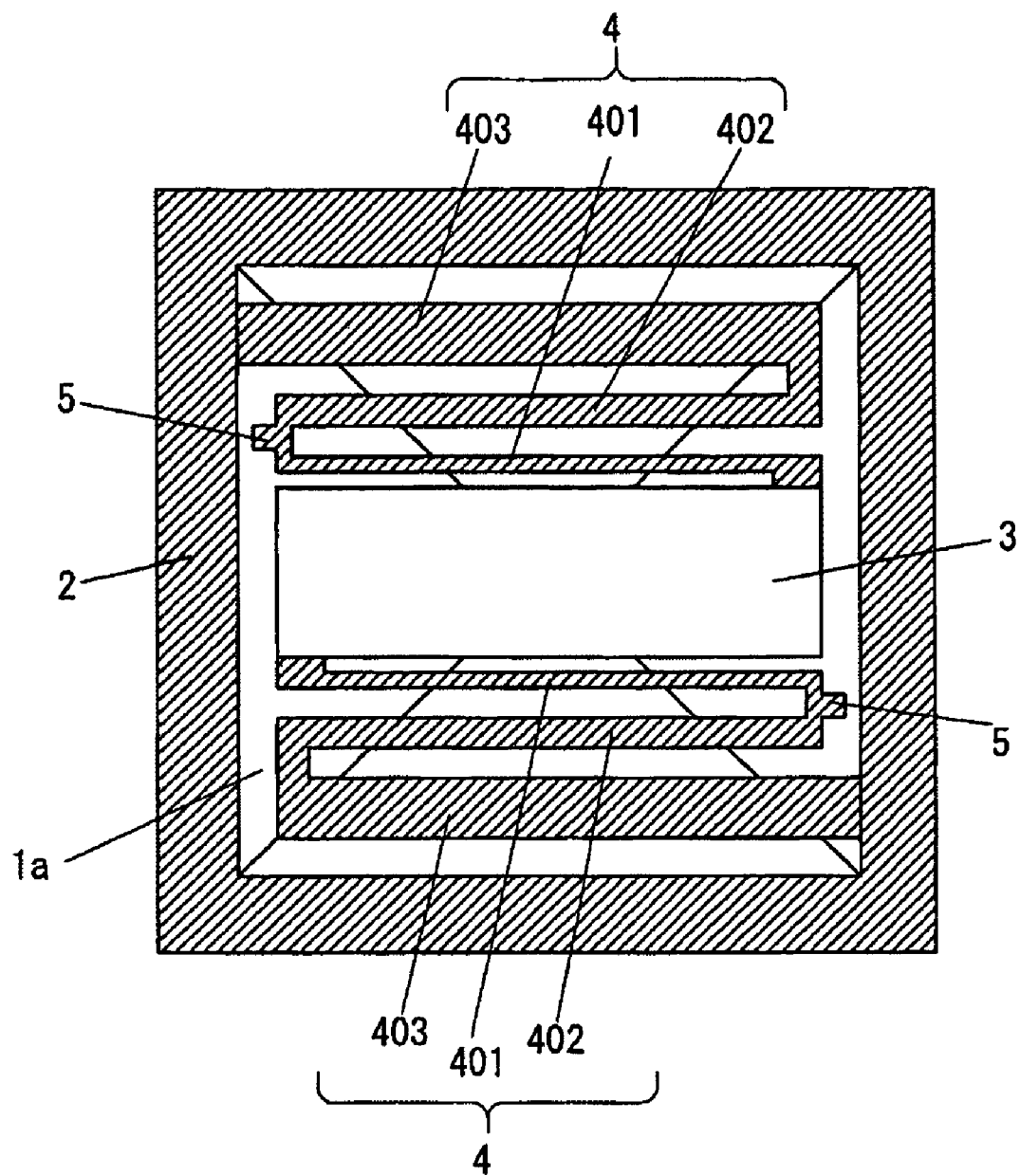
FIG. 9 is a simplified top plan view of an infrared detection element in accordance with a second modification of the present invention.

FIG. 9 is a simplified top plan view of an infrared detection element in accordance with a second modification of the present invention. In the infrared detection element of the second modification, the light receiver 3 is supported by a pair of the beams 4. The beams 4 are each formed into zigzag shapes and include a first beam 401, a second beam 402, and a third beam 403. The beams 4 become progressively narrower in the order of the beam 403, the beam 402, and the beam 401. When the beams 4 have such a shape, a heat transmission path from the light receiver 3 to the frame 2 becomes longer and the beams 4 become narrower closer to the light receiver 3. Therefore, the amount of heat transmitted from the light receiver 3 toward the substrate 1 is extremely low, and the heat detection precision can be prevented from decreasing. On the other hand, the beams 4 readily bend, and the light receiver 3 readily comes into contact with the substrate structure (e.g., substrate 1 and/or frame 2).

In the infrared detection element of the second modification, the protuberance 5 is formed on the portion where the first beam 401 and the second beam 402 are connected. When the beams 4 bend due to impact, force or other action, the light receiver 3 will undergo the greatest amount of displacement toward the substrate structure (e.g., substrate 1 and/or frame 2). However, displacement is limited by the protuberance 5 coming into contact with the substrate structure (e.g., substrate 1 and/or frame 2), and the light receiver 3 can thereby be prevented from coming into contact with the substrate structure (e.g., substrate 1 and/or frame 2). As a result, the contacting area between the beams 4 and the substrate structure (e.g., substrate 1 and/or frame 2) during displacement can be greatly reduced, and the detection precision during deformation can be prevented from deteriorating.

In the second modification shown in FIG. 9, the protuberances 5 are formed on the portion where the first beam 401 and the second beam 402 are connected. However, the position of the protuberance 5 is not limited to this position. As long as the light receiver 3 can be prevented from making contact with the substrate structure (e.g., substrate 1 and/or frame 2). The position can, for example, be a connector between the first beam 401 and the light receiver 3. In addition, the area of contact between the protuberance 5 and the substrate structure (e.g., substrate 1 and/or frame 2) is extremely small. Therefore, the protuberance 5 can also be provided to the outer periphery of the light receiver 3, as in the example shown in FIG. 8. However, the protuberance 5 is preferably provided to the beams 4 rather than the light receiver 3 in order to minimize the amount of heat released by the light receiver 3 toward the substrate 1, and in order to minimize reduction in the detection sensitivity.

Figure 10A:
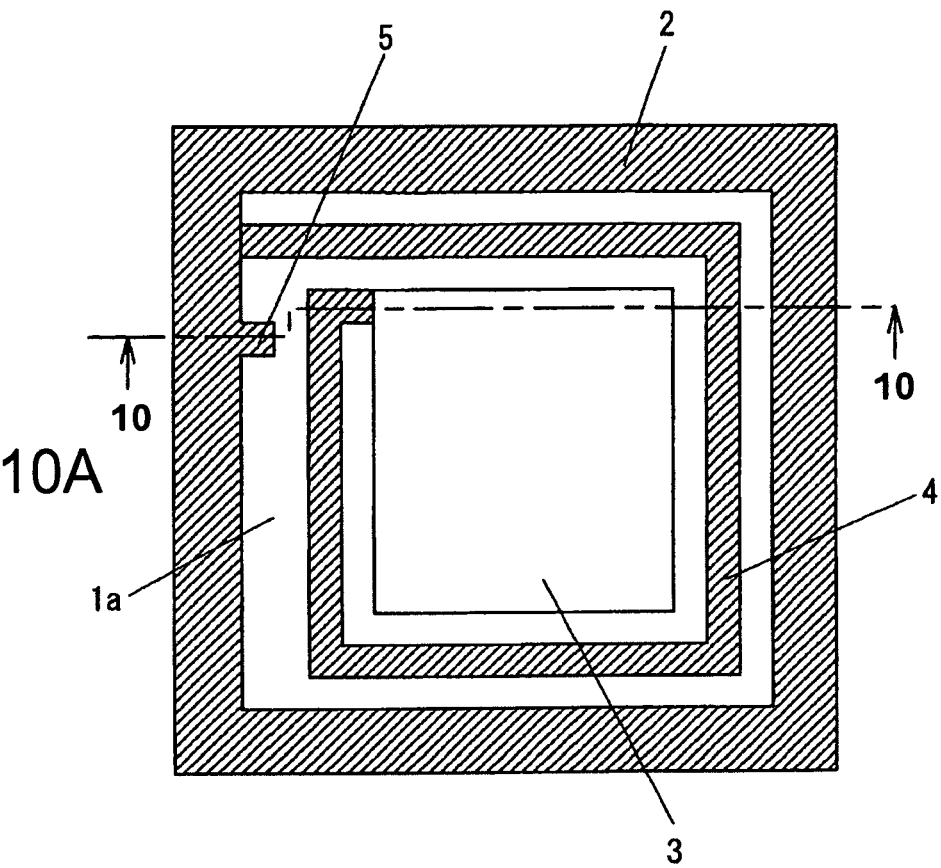
FIG. 10A is a simplified top plan view of an infrared detection element in accordance with a third modification of the present invention.
Figure 10B:
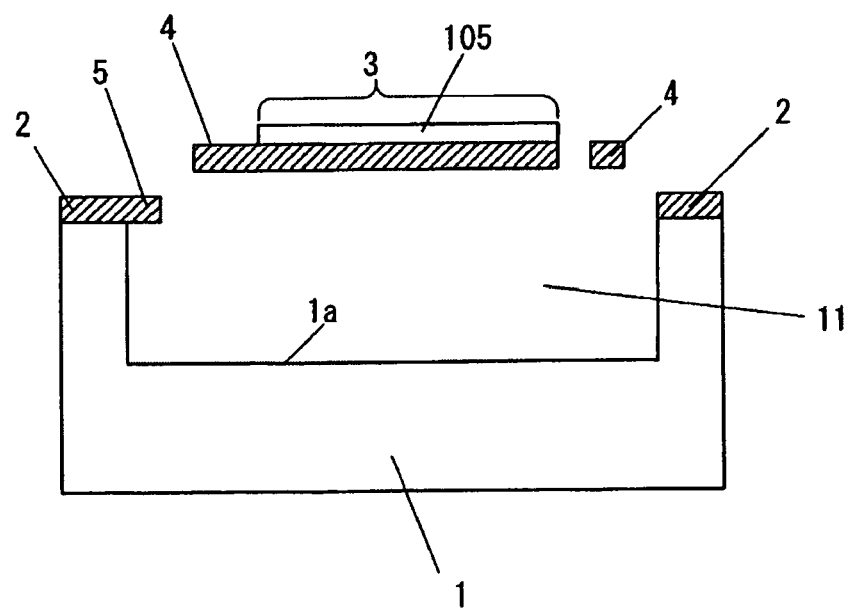
FIG. 10B is a simplified cross-sectional view of the infrared detection element in accordance with the third modification of the present invention as seen along section line 10-10 in FIG. 10A.

FIG. 10 is a diagram showing a third modification of the present invention, with FIG. 10A being a top plan view of the infrared detection element, and FIG. 10B being a cross-sectional view along F-F'. In third modification, the beams 4 are formed into a coil shape so as to surround the light receiver 3. The protuberance 5 is formed on the side of the frame 2, and protrudes so as to extend from the frame 2 toward the beams 4. The light receiver 3 and the beams 4 are formed higher than the frame 2, as shown in FIG. 10B. Thus, when the infrared detection element having the coil-shaped beams 4 is subjected to an impact, force or other action, and the light receiver 3 and the beams 4 are subjected to a downward force as shown in FIG. 11B, the beams 4 will bend so as to twist and move downward, and the light receiver 3 will be displaced downward while being rotated, as shown in FIG. 11A.

As a result, the beam 4 that is placed on the left side of the light receiver 3 in the drawing and that is adjacent the protuberance 5 will be prevented from moving in a leftward direction, rising onto or making contact with the protuberance 5, and moving even further downward during deformation. The position where the protuberance 5 is formed can be set to a position where the deformed beam 4 will rise onto the protuberance 5, with the state of deformation of the beam 4 having been predicted in advance. In the resulting structure, the beam 4 and substrate 1 will short-circuit through the protuberance 5, rigidity will mechanically increase, and forceful breakage will tend not to occur. In the structure provided in third modification, the beam 4 is stopped by the protuberance 5 formed on the frame 2. Therefore, the concavity 1a does not need to be formed using crystalline anisotropic etching, which exposes the (111) plane of the substrate 1, as in a detection element such as the one described in the above embodiment. The protuberance 5 on the beam 4 is prevented from being deformed through contact made with an inclined surface of the concavity 1a of the substrate 1. In other words, the concavity 1a such as shown in FIG. 10B can be formed by isotropic etching, or by anisotropic etching perpendicular to the surface of the substrate 1. In addition, a through-hole rather than a concavity 1a can be used on the lower part of the light receiver 3 and the beams 4.

Figure 12A:
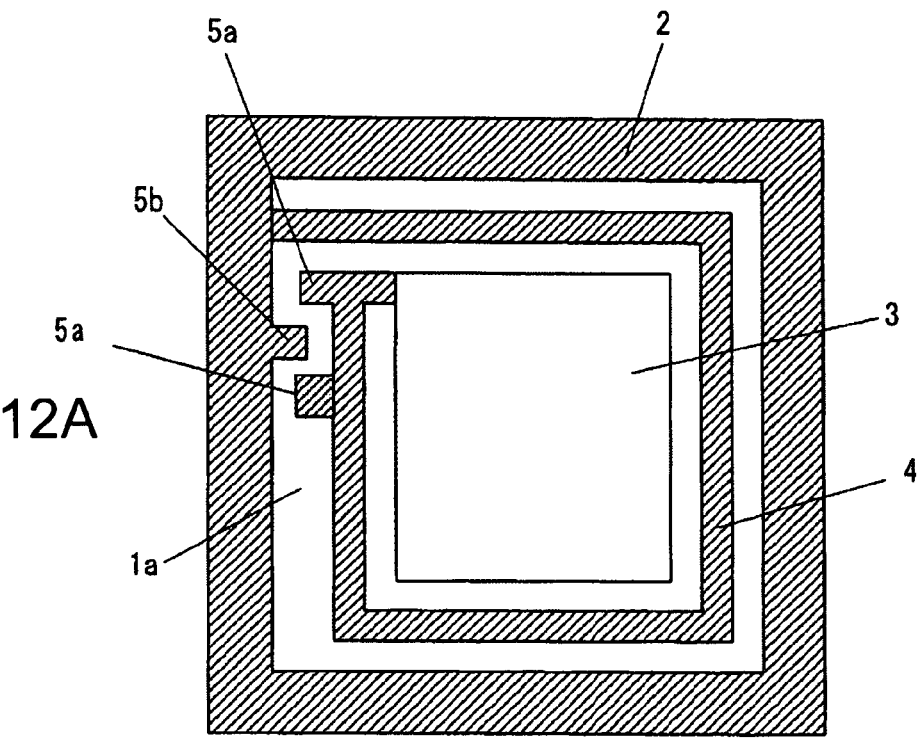
FIG. 12A is a simplified top plan view of an infrared detection element in accordance with a fourth modification of the present invention in which the infrared detection element has not been subjected to an impact or force to bend the beam.
Figure 12B:
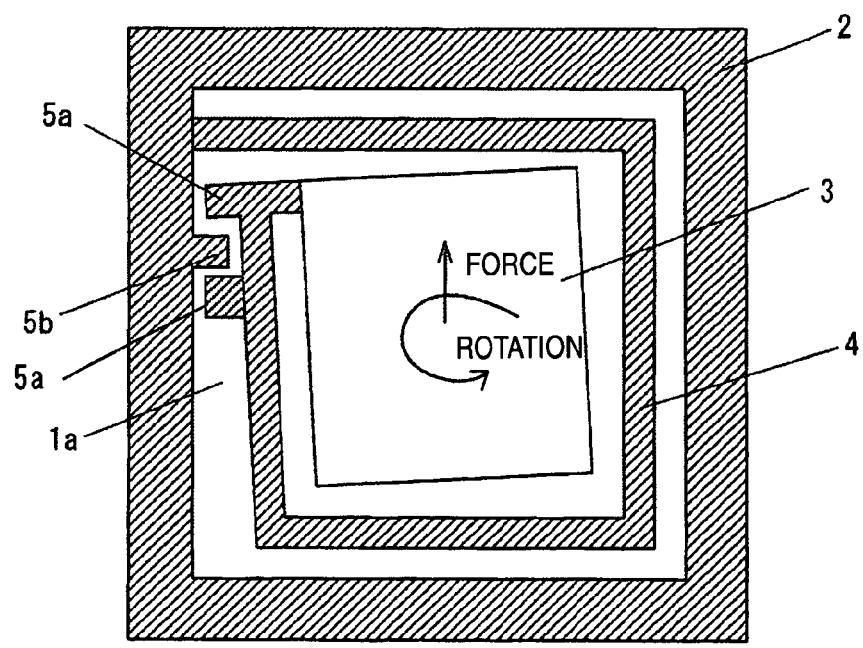
FIG. 12B is a simplified top plan view of the infrared detection element in accordance with the fourth modification of the present invention in which the infrared detection element has been subjected to an impact or force to bend the beam.

FIG. 12 is a diagram showing a fourth modification of the present invention, with FIG. 12A being a top plan view of an infrared detection element in which a beam 4 is not deformed, and FIG. 12B being a top plan view of an instance in which the beam 4 has been subjected to a force and has been deformed. In the fourth modification, a protuberance 5 is formed on both the beam 4 and the frame 2, and a protuberance 5a that protrudes toward the frame 2 is formed on the beam 4. A protuberance 5b that protrudes toward the beam 4 is also formed on the frame 2 on the side on which the protuberance 5a protrudes. In this instance as well, the light receiver 3 and the beams 4 are formed at positions that are higher than the frame 2 in relation to the thickness direction of the substrate in a manner similar to the third modification (see FIG. 10B).

Figure 11A:
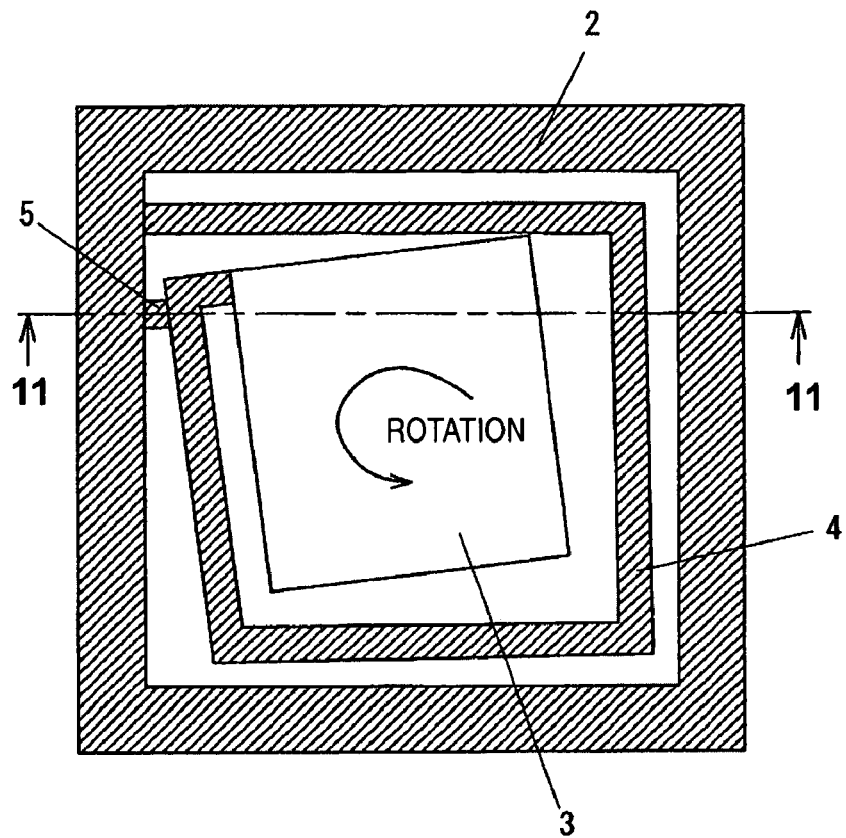
FIG. 11A is a simplified top plan view of the infrared detection element in accordance with the third modification of the present invention in which the infrared detection element has been subjected to an impact or force to bend the beam.
Figure 11B:
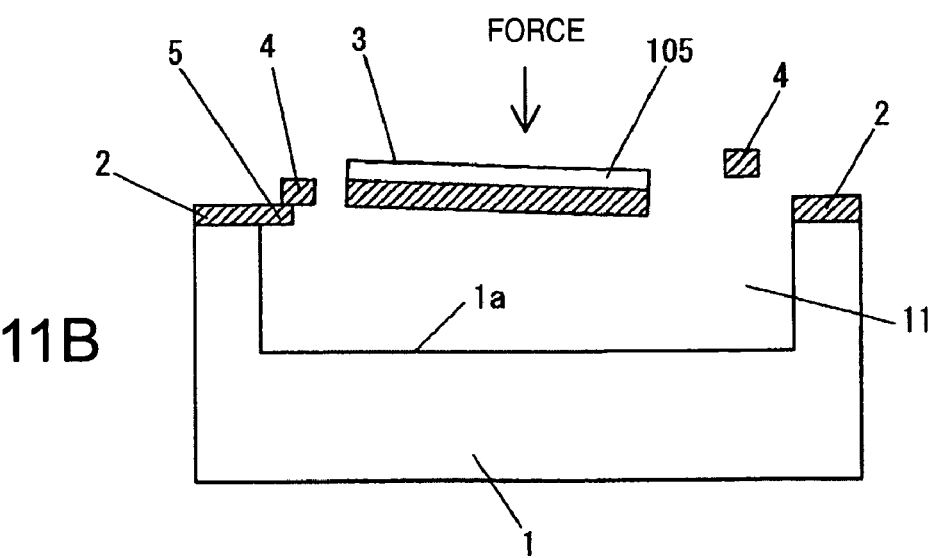
FIG. 11B is a simplified cross-sectional view of the infrared detection element in accordance with the third modification of the present invention as seen along section line 11-11 in FIG. 11A.

As described in the abovementioned third modification, when the infrared detection element having a coiled beam 4 such as that shown in FIG. 11A is subjected to a downward force, the beam 4 is deformed so that the light receiver 3 rotates. However, when a downward force is applied and an inertial force is further exerted upward by an impact, force or the like in a plane such as the one shown in FIG. 12B, the beam 4 and light receiver 3 are displaced toward the upper part of the drawing, and the part of the beam 4 that approaches the protuberance 5 decreases in size, as compared with the case shown in FIG. 11A. For this reason, the beam 4 deforms dramatically below the frame 2 without being stopped by the protuberance 5 on the frame 2 side, and the beam 4 makes contact with a surface defining the concavity 1a.

In fourth modification, a protuberance 5a is provided to the beam 4 so that a protuberance 5b provided to the frame 2 is surrounded on either side. The protuberance 5a of the beam 4 accordingly rises up onto or strikes the protuberance 5b on the frame 2 and is thereby stopped, even when subjected to a force in the planar direction other than a downward force. As a result, the protuberance 5a and protuberance 5b come into contact, the rigidity of the beam 4 is thereby temporarily increased, and forceful breakage is much less likely to occur.

Figure 13A:
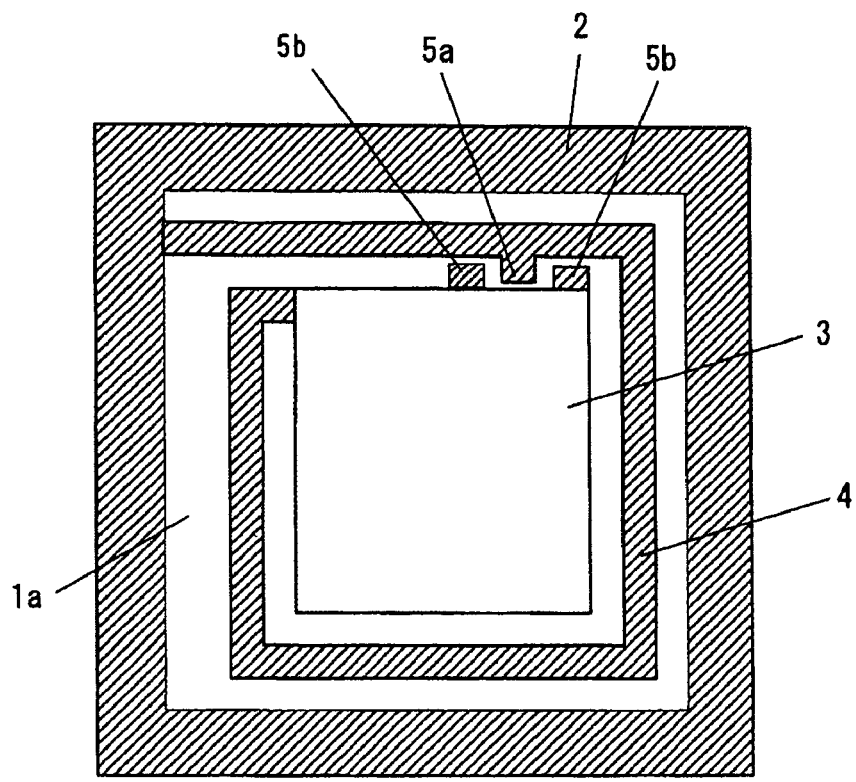
FIG. 13A is a simplified top plan view of an infrared detection element in accordance with a fifth modification of the present invention in which the infrared detection element has not been subjected to an impact or force to bend the beam.
Figure 13B:
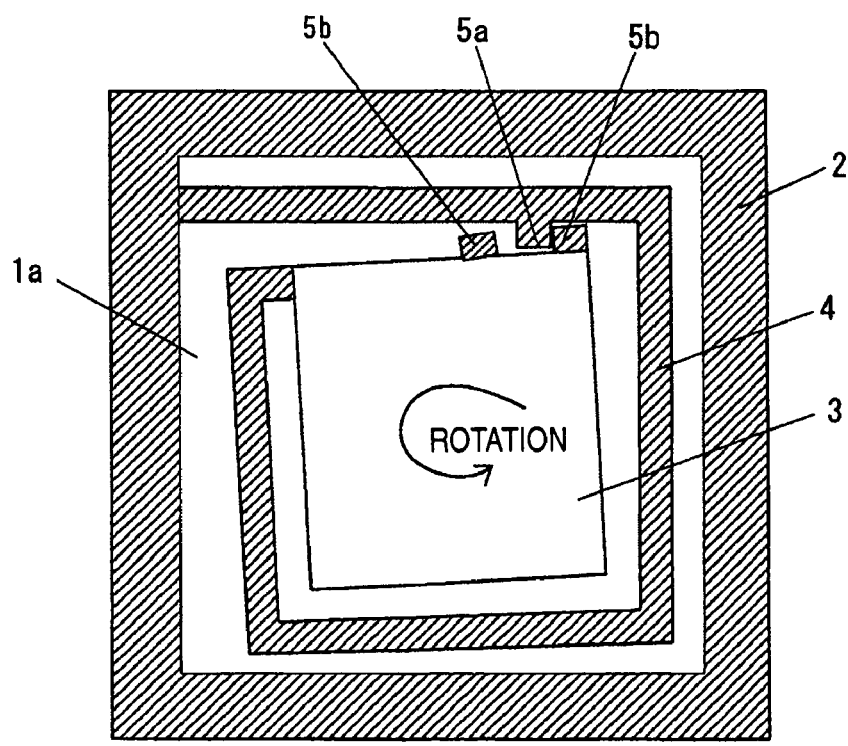
FIG. 13B is a simplified top plan view of the infrared detection element in accordance with the fifth modification of the present invention in which the infrared detection element has been subjected to an impact or force to bend the beam.

In FIG. 12, the protuberance 5b is formed on the frame 2. However, in accordance with a fifth modification of the present invention, the protuberance 5a on the beam 4 can be made to protrude toward the light receiver 3, and the protuberance 5b that is stopped by the protuberance 5a can be provided to the light receiver 3, as shown in FIG. 13A. In this instance, when the beam 4 bends, the protuberance 5b of the light receiver 3 does not rise up onto the protuberance 5a formed on the beam 4. However, the side surfaces of the protuberances 5a, 5b come into contact with each other as shown in FIG. 13b, the protuberance 5b is stopped by the protuberance 5a, and further rotation of the light receiver 3 is prevented. As a result, bending of the beam 4 is decreased, and the light receiver 3 and the beams 4 can be prevented from making contact with the surface of the concavity 1a.

Such an effect can also be achieved by using the protuberances 5a, 5b shown in FIG. 12. The protuberances 5a, 5b can be formed to the same height. However, the protuberance 5b is preferably formed at a higher position than the protuberance 5a. The protuberances 5a, 5b will therefore readily be stopped, and a state in which the protuberance 5b rises onto the protuberance 5a will readily occur. The protuberances 5a, 5b are preferably disposed in positions that are in close proximity to each other in order to enable the protuberance 5a to be readily stopped by the protuberance 5b. In FIGS. 12 and 13, a single protuberance has a protuberance on either side; however, the number of protuberances is not particularly limited.

Figure 14:
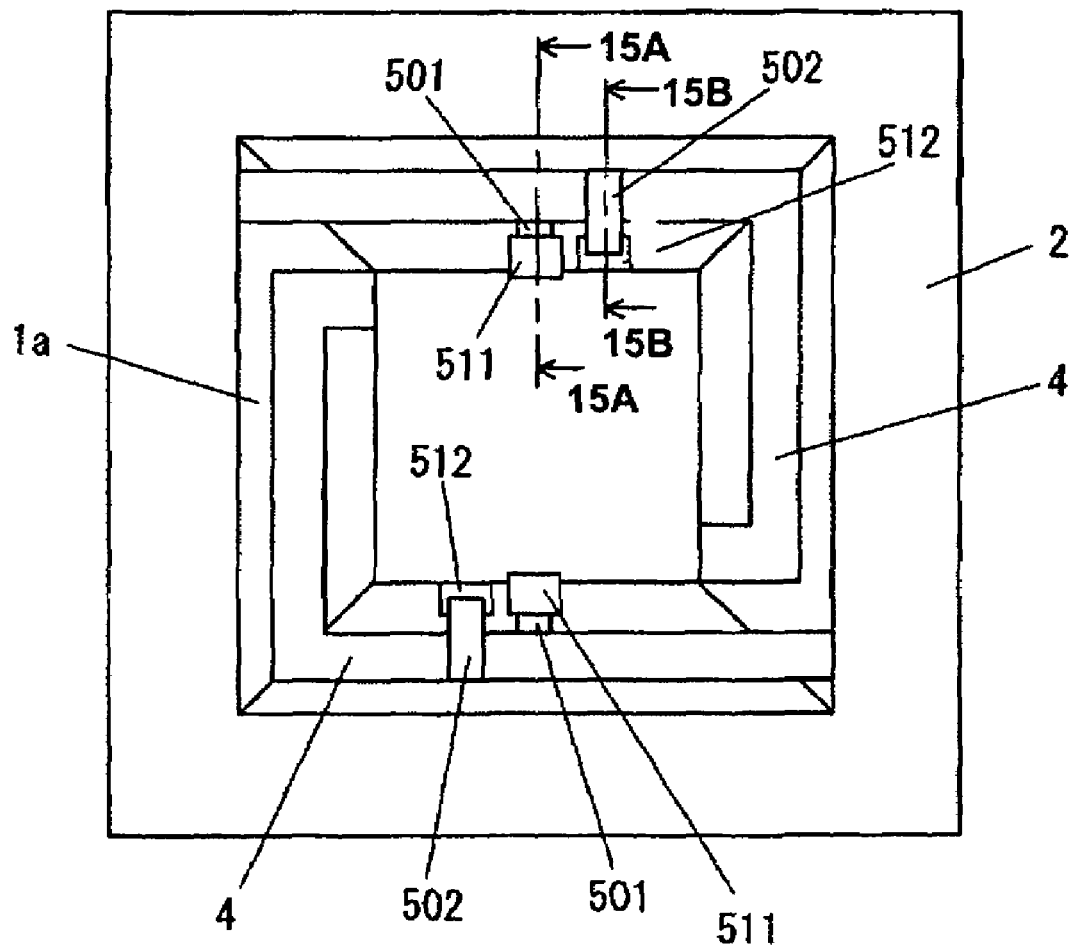
FIG. 14 is a top plan view of an infrared detection element in accordance with a sixth modification of the present invention.

FIG. 14 is a diagram showing a sixth modification of the present invention. In sixth modification, a protuberance formed on the light receiver 3 and a protuberance formed on the beam 4 engage during bending of the beam 4, and further bending of the beam 4 is prevented in the same manner as in sixth modification. In sixth modification, the downward displacement of the light receiver 3 during bending of the beam 4 is minimized by engagement between a protuberance 512 on the light receiver 3 and a protuberance 501 on the beam 4, but a protuberance 511 on the light receiver 3 and a protuberance 502 on the beam 4 also engage when the light receiver 3 is upwardly displaced, whereby upward displacement of the light receiver 3 is also minimized. As a result, the light receiver 3 and the beams 4 can be prevented from making contact with the surface defining the concavity 1a of the substrate 1, and damage to the beam 4 due to excessive bending can also be prevented.

Figure 15A:
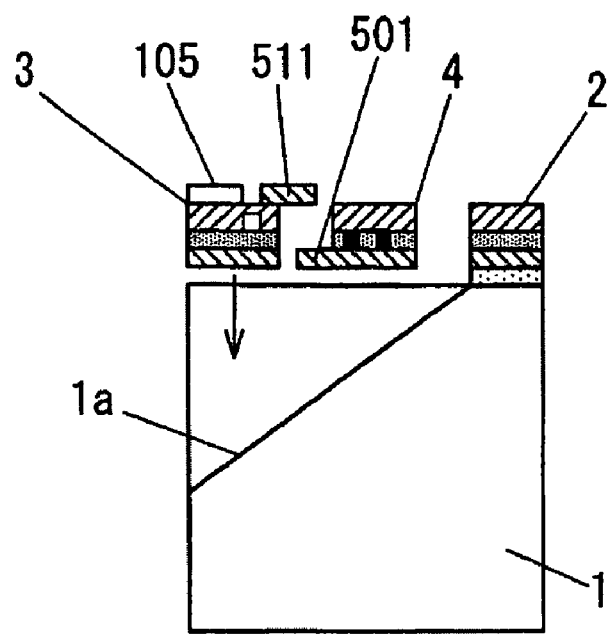
FIG. 15A is a simplified cross-sectional view of the infrared detection element in accordance with the sixth modification of the present invention as seen along section line 15A-15A in FIG. 14.
Figure 15B:
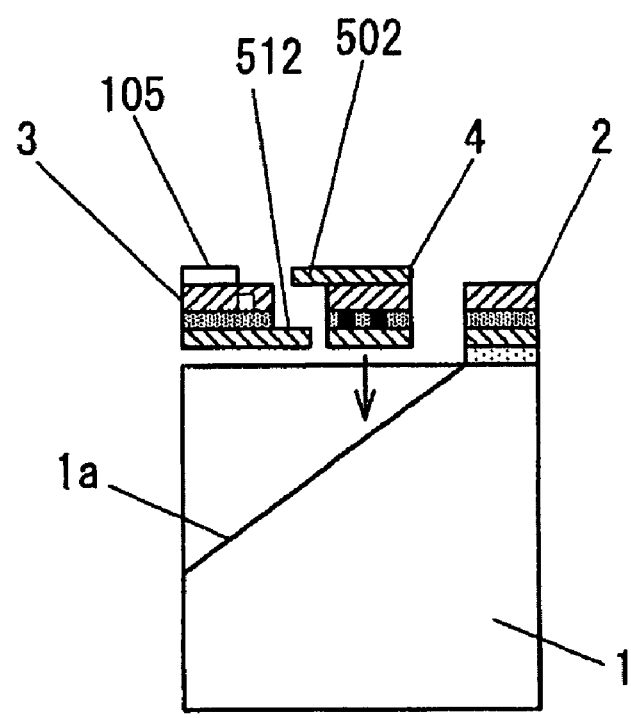
FIG. 15B is a simplified cross-sectional view of the infrared detection element in accordance with the sixth modification of the present invention as seen along section line 15B-15B in FIG. 14.
Figure 16A:
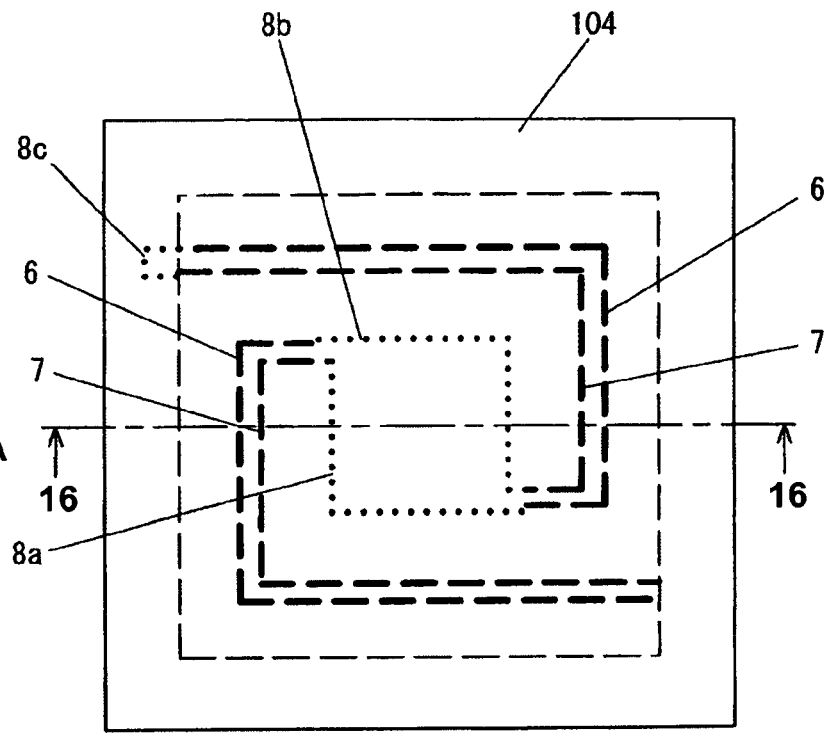
FIG. 16A is a simplified top plan view showing a first step in manufacturing the infrared detection element of the sixth modification of the present invention.
Figure 16B:
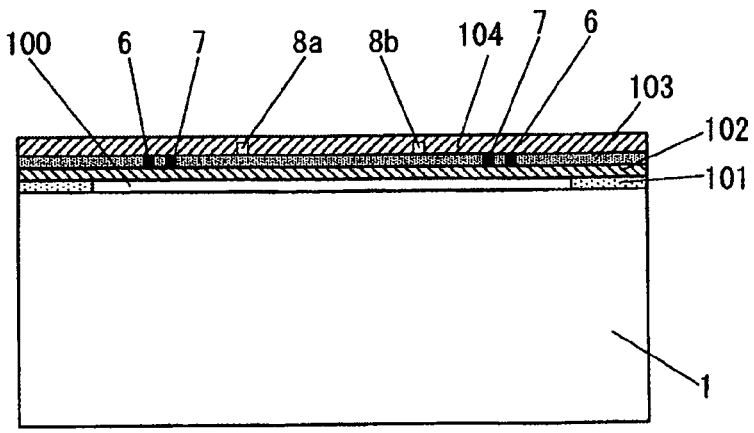
FIG. 16B is a simplified cross-sectional view showing the first step in manufacturing the infrared detection element of the sixth modification of the present invention as seen along section line 16-16 in FIG. 16A.

The protuberances 501, 502, 511 and 512 are each formed in pairs at the top and bottom of the drawing. FIG. 15A is a cross-sectional view along 15A-15A of the portion having the protuberances 501 and 511. FIG. 15B is a cross-sectional view along 15B-15B of the portion having the protuberances 502 and 512. As shown in FIG. 15A, the protuberance 501 is formed on the bottom surface of the beam 4, while the protuberance 511 is formed on the top surface of the light receiver 3. The protuberances 501 and 511 are disposed so as to overlap across a gap formed in the thickness direction of the substrate. For this reason, when the light receiver 3 is displaced in the direction of the arrow, the protuberance 511 strikes the protuberance 501 of the beam 4, and the light receiver 3 and the beams 4 engage in the contacting portion, making it possible to prevent the portion having the light receiver 3 from being markedly displaced. As a result, the light receiver 3 and the beams 4 can be prevented from making linear contact with the surface defining the concavity 1a, and excessive bending of the beam 4 can be prevented.

FIGS. 16 through 20 are diagrams describing a process for manufacturing the infrared detection element of sixth modification. A case in which the frame 2, the light receiver 3, and the beams 4 are formed at the same height shall be described hereunder. First, the etching sacrifice layer 100 and the etching stopper layer 101 are created by forming a polysilicon layer on the silicon substrate 1, as shown by the cross-sectional diagram along 16-16 in FIG. 16B. As described above, the frame 2, the light receiver 3, and the beams 4 are formed to the same height. Therefore, the etching sacrifice layer 100 and the etching stopper layer 101 have the same thickness.

Figure 4B:
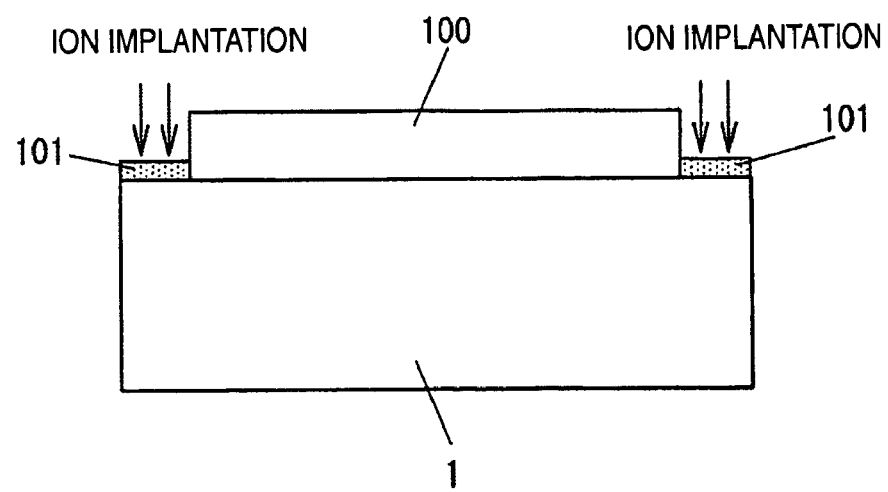
FIG. 4B is a simplified cross-sectional view showing the third step in manufacturing the infrared detection element of the present invention.

The light receiver 3 and the beams 4 may be made higher than the frame 2 by making the etching sacrifice layer 100 thicker in the same manner as in FIG. 4B. Next, the following element are formed in the stated order in the same manner as in the step shown in FIG. 5: the insulation layer 102 formed from a silicon nitride film, the P-polysilicon 6 and N-polysilicon 7 on the insulation layer 102, the interlayer insulating film 103, the aluminum wires 8a through 8c, the connector 9 (not shown), and the protecting film 104. Thus, a temperature sensor is formed.

Figure 17A:
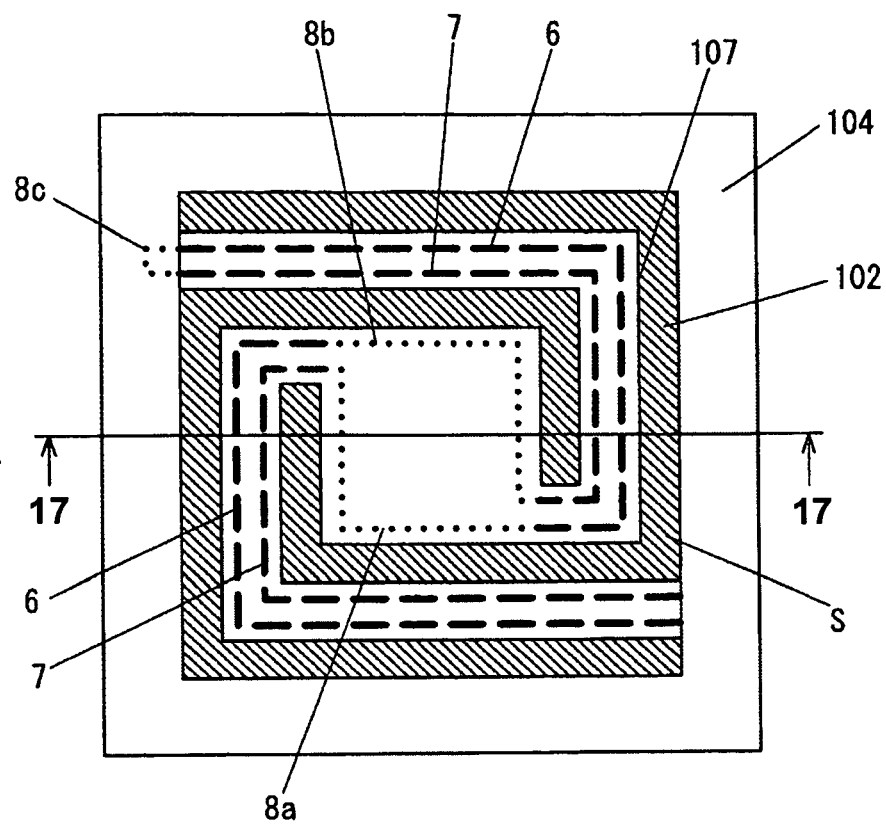
FIG. 17A is a simplified top plan view showing a second step in manufacturing the infrared detection element of the sixth modification of the present invention.
Figure 17B:
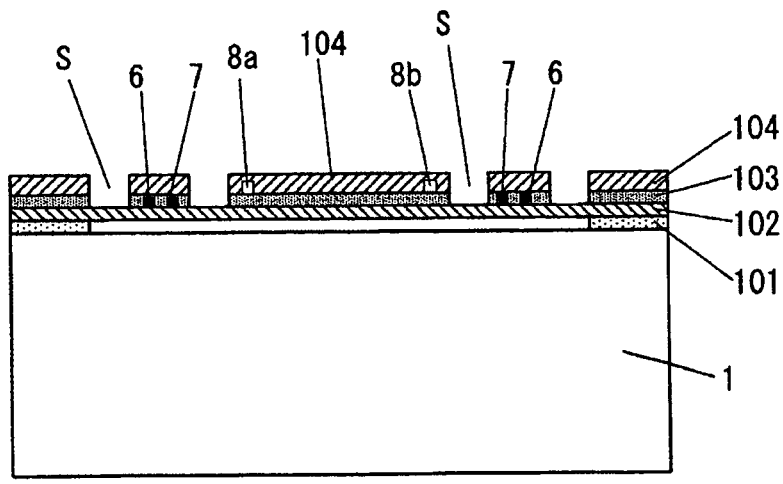
FIG. 17B is a simplified cross-sectional view showing the second step in manufacturing the infrared detection element of the sixth modification of the present invention as seen along section line 17-17 in FIG. 17A.
Figure 18A:
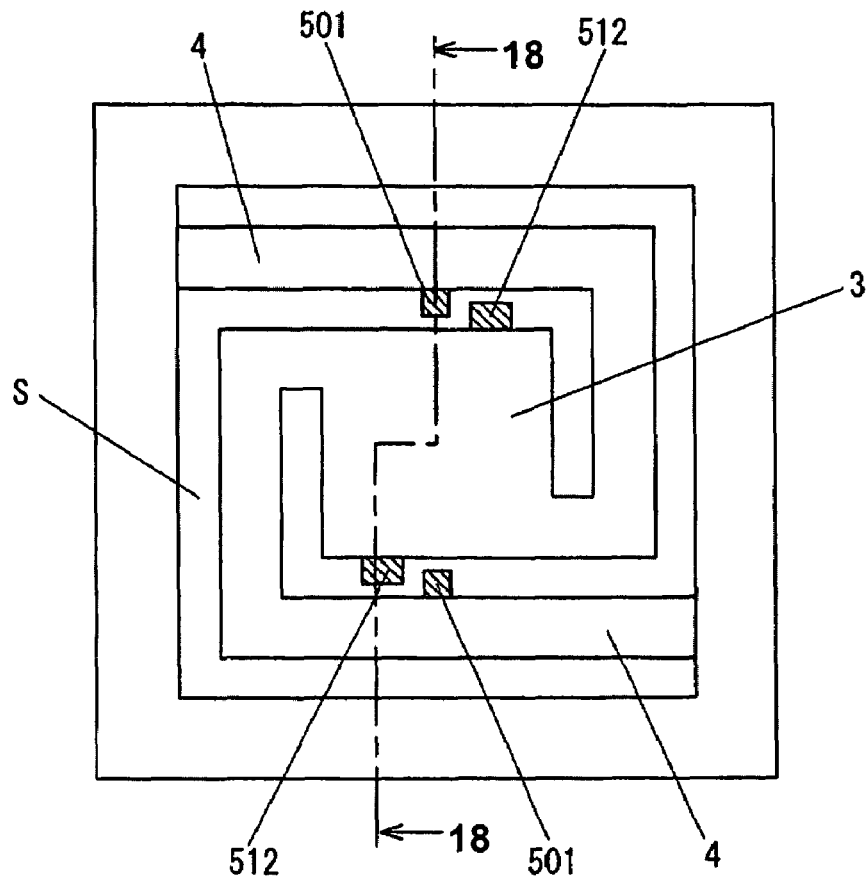
FIG. 18A is a simplified top plan view showing a third step in manufacturing the infrared detection element of the sixth modification of the present invention.
Figure 18B:
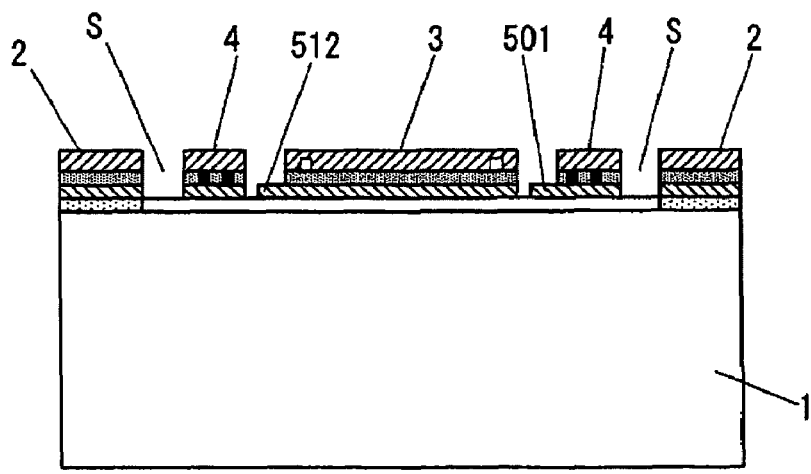
FIG. 18B is a simplified cross-sectional view showing the third step in manufacturing the infrared detection element of the sixth modification of the present invention as seen along section line 18-18 in FIG. 18A.

In the step shown in FIG. 17, an etching slit S is formed using anisotropic etching. The anisotropic etching is performed until the insulating film 102 is exposed. In the step shown in FIG. 18, the insulating film 102, which is a substrate for the beams 4 and the light receiver 3, is etched using anisotropic etching, and the protuberances 501, 512, which are provided to the bottom surfaces of the beams 4 and the light receiver 3, are formed. In the step shown in FIG. 19, the etching slit S is filled with a polyimide or the like to form a slit sacrifice layer 108. A resist material, silicon, or a material other than a polyimide may be used as the material for the slit sacrifice layer 108.

Figure 19A:
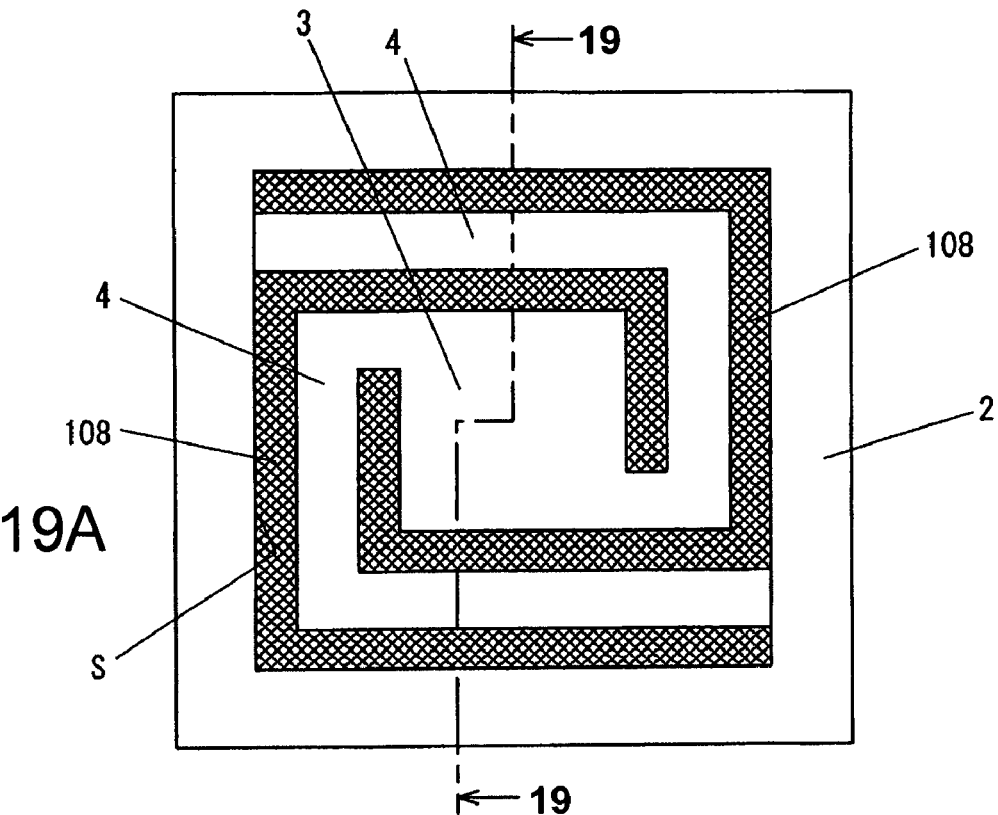
FIG. 19A is a simplified top plan view showing a fourth step in manufacturing the infrared detection element of the sixth modification of the present invention.
Figure 19B:
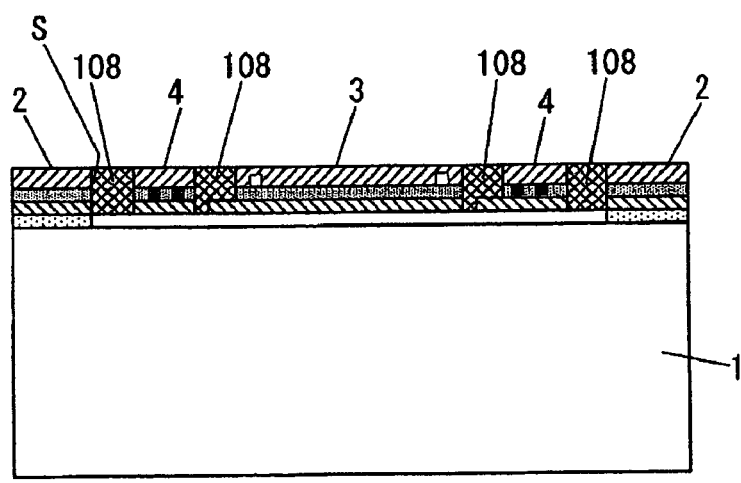
FIG. 19B is a simplified cross-sectional view showing the fourth step in manufacturing the infrared detection element of the sixth modification of the present invention as seen along section line 19-19 in FIG. 19A.
Figure 20A:
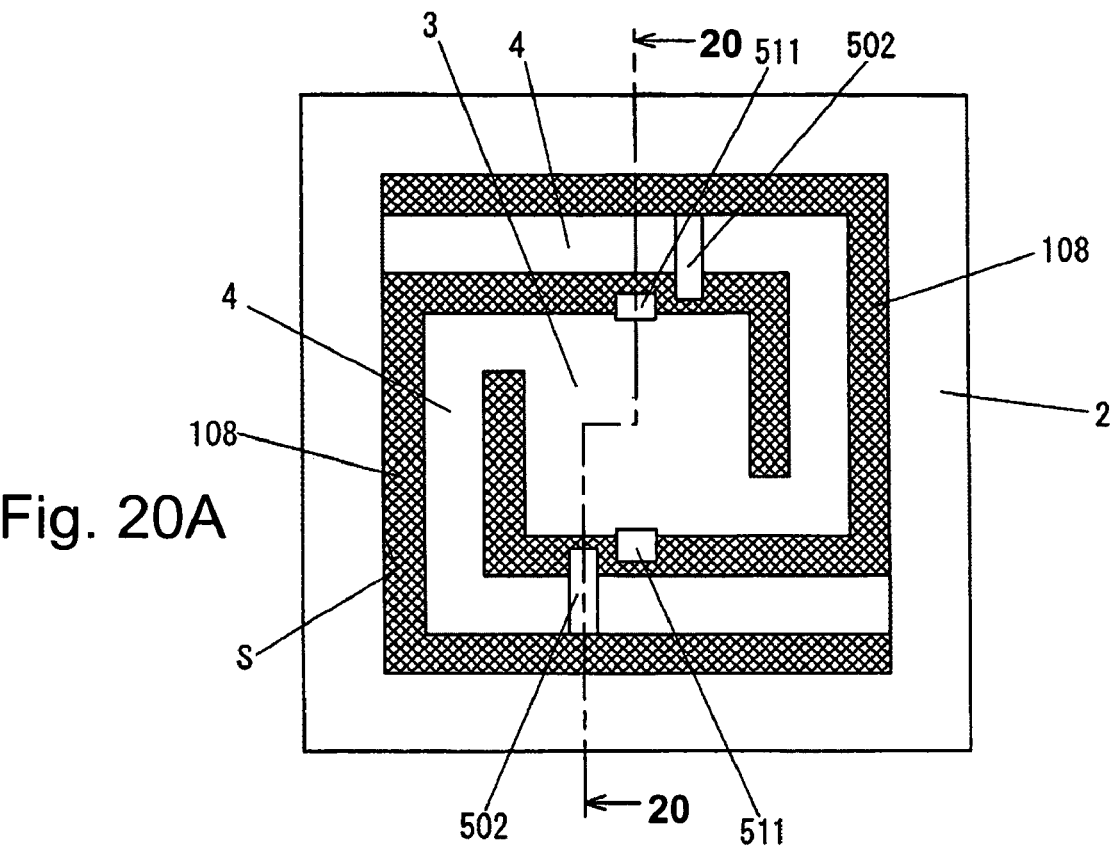
FIG. 20A is a simplified top plan view showing a fifth step in manufacturing the infrared detection element of the sixth modification of the present invention.
Figure 20B:
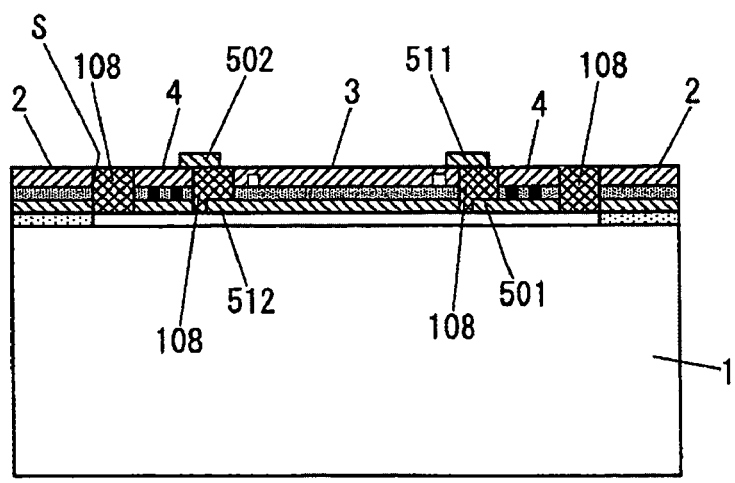
FIG. 20B is a simplified cross-sectional view showing the fifth step in manufacturing the infrared detection element of the sixth modification of the present invention as seen along section line 20-20 in FIG. 20A.
Figure 21A:
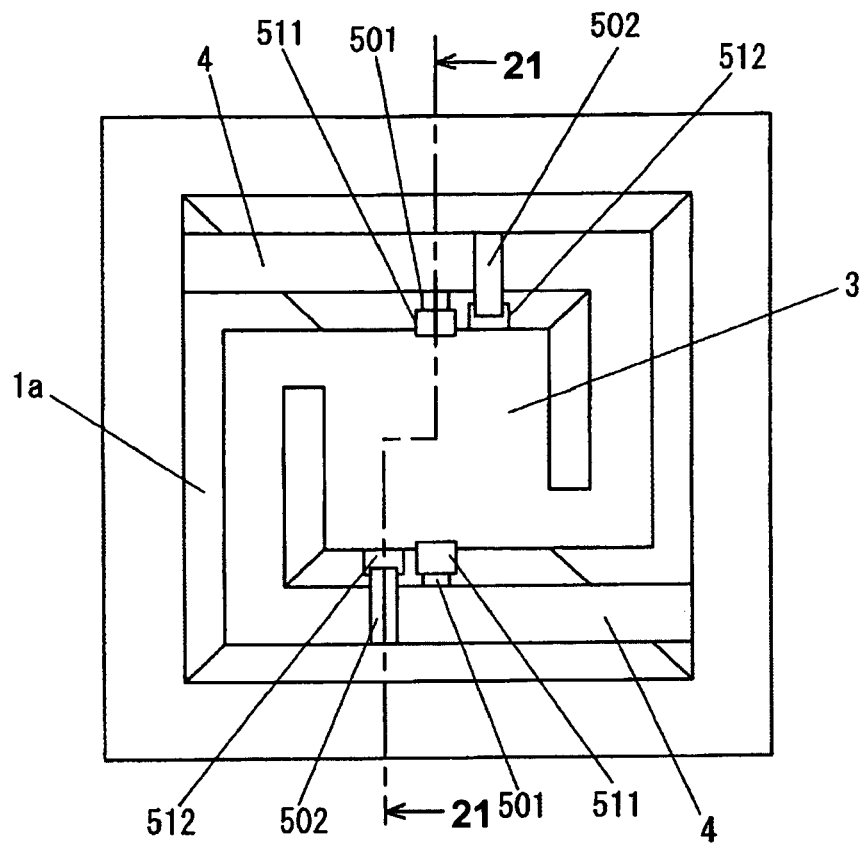
FIG. 21A is a simplified top plan view showing a sixth step in manufacturing the infrared detection element of the sixth modification of the present invention.
Figure 21B:
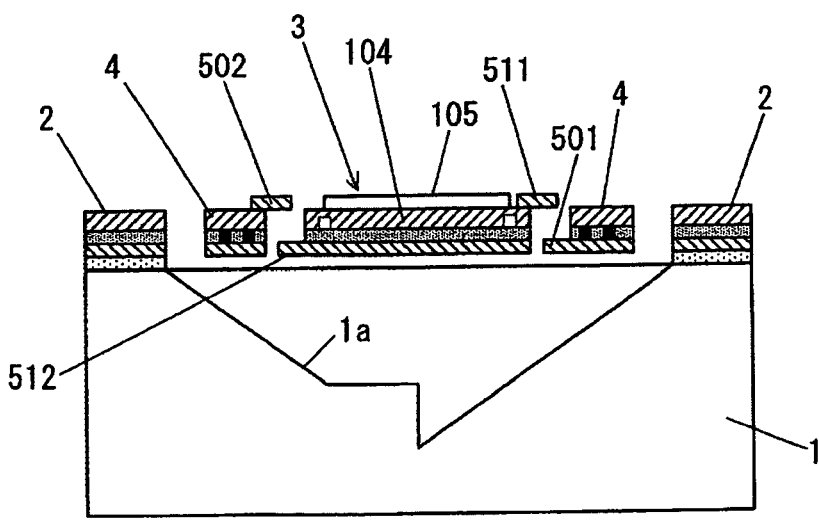
FIG. 21B is a simplified cross-sectional view showing the sixth step in manufacturing the infrared detection element of the sixth modification of the present invention as seen along section line 21-21 in FIG. 21A.

In the step shown in FIG. 20, a silicon nitride film or the like is formed on a top surface of the substrate shown in FIG. 19. The silicon nitride film is then etched into a pattern, thereby forming the upper protuberances 502 and 511. In the step shown in FIG. 21, an infrared-absorbing film 105 is formed on the protecting film 104 of the light receiver 3. The slit sacrifice layer 108 is then removed, and the concavity 1a is subsequently formed on the substrate 1 by performing crystalline anisotropic etching using hydrazine.

Figure 22A:
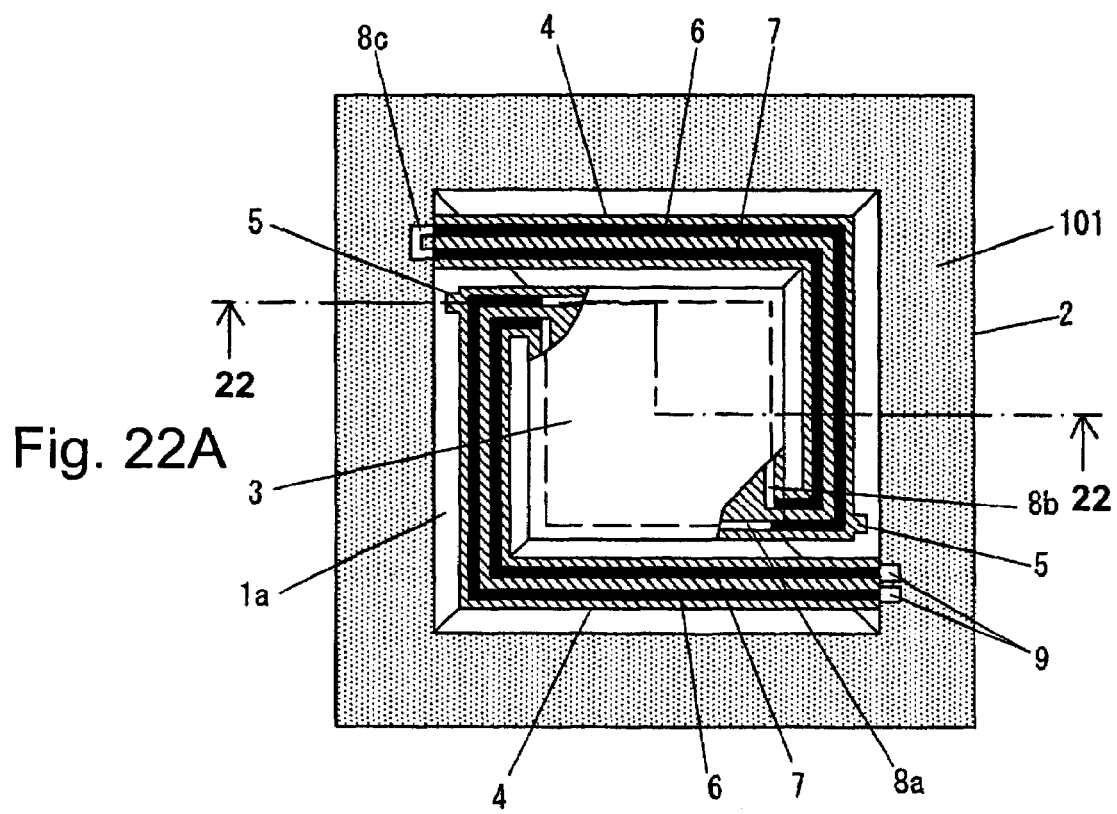
FIG. 22A is a simplified top plan view showing an infrared detection element in accordance with a seventh modification of the present invention.
Figure 22B:
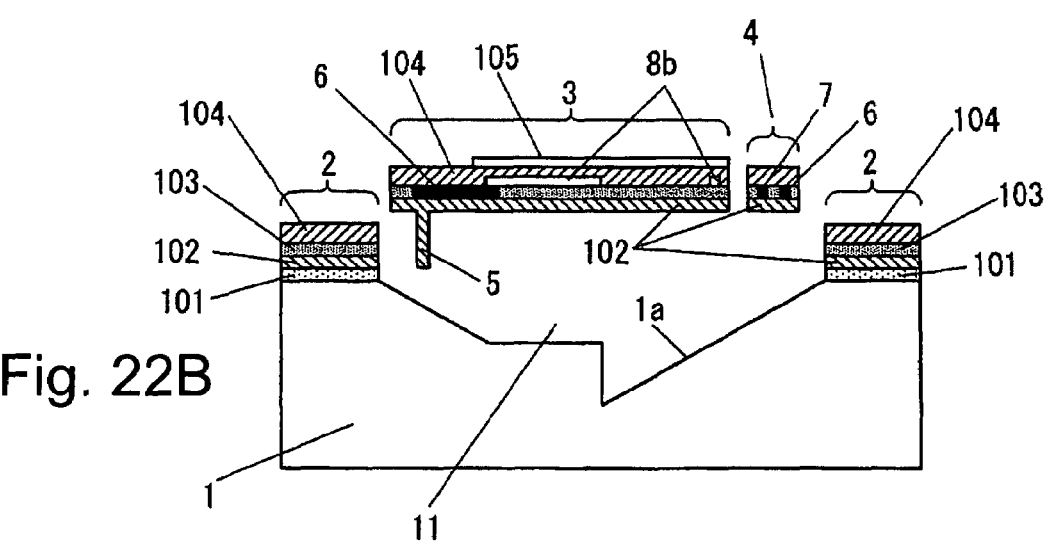
FIG. 22B is a simplified cross-sectional view showing the infrared detection element of the seventh modification of the present invention as seen along section line 22-22 in FIG. 22A.

FIG. 22 is a diagram showing a seventh modification of the present invention. In the infrared detection element of the seventh modification, the protuberances 5 protrude from the bottom surfaces of the beams 4 toward the concavity 1a. The protuberance 5 is formed on the beams 4 (see FIG. 22B). For this reason, when the beams 4 and the light receiver 3 are displaced downwardly (in the direction of the concavity 1a) due to an impact, force or other action, the protuberance 5 strikes the substrate 1. Thus, the beam 4 is prevented from making linear contact with the substrate 1, and excessive bending of the beams 4 can also be prevented. In addition, the beams 4 can be more effectively prevented from bending in comparison to when a protuberance that is parallel to the substrate 1 is used. The protuberance 5 can also be formed on the bottom surface of the light receiver 3.

Figure 23A:
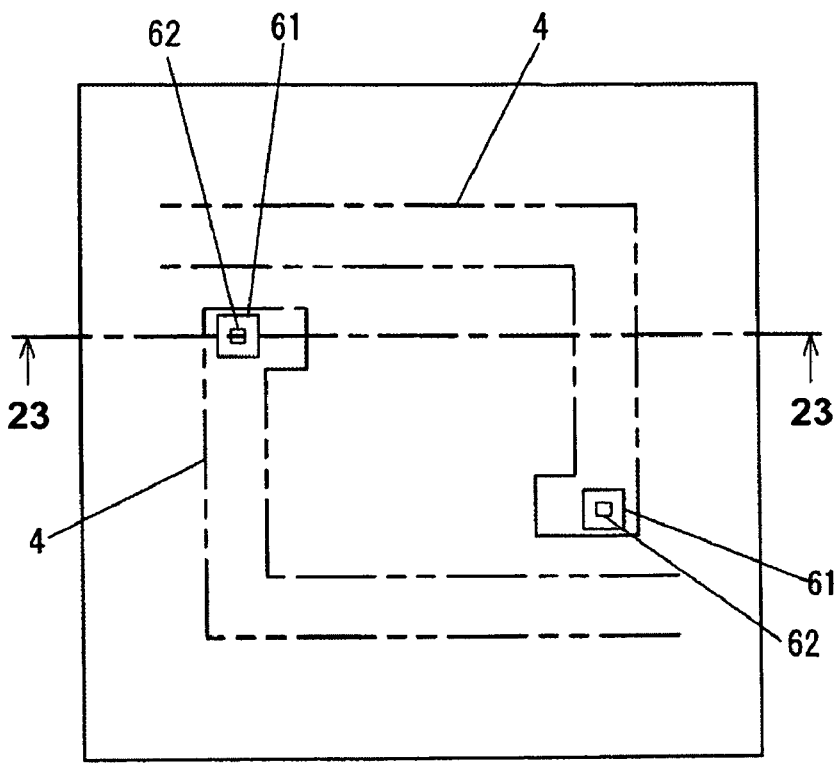
FIG. 23A is a simplified top plan view showing an eighth step in manufacturing the infrared detection element of the seventh modification of the present invention.
Figure 23B:
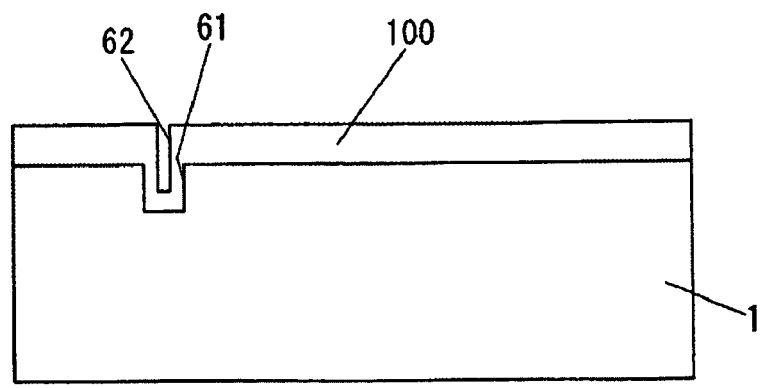
FIG. 23B is a simplified cross-sectional view showing the eighth step in manufacturing the infrared detection element of the seventh modification of the present invention as seen along section line 23-23 in FIG. 23A.

FIGS. 23 and 24 are diagrams describing the manufacturing process. In the step shown in FIG. 23, holes 61 are formed in the silicon substrate 1. The holes 61 are used for forming a protuberance 5, and are formed in correspondence with the position where the protuberance 5 of the beam 4 is formed. A lateral cross-section of the holes 61 need not be rectangular in shape. The polysilicon etching-sacrifice layer 100 is next formed on the surface of the substrate 1, and holes 62 having the shape of the protuberance 5 are subsequently formed by subjecting the area having the holes 61 to anisotropic etching.

Figure 24A:
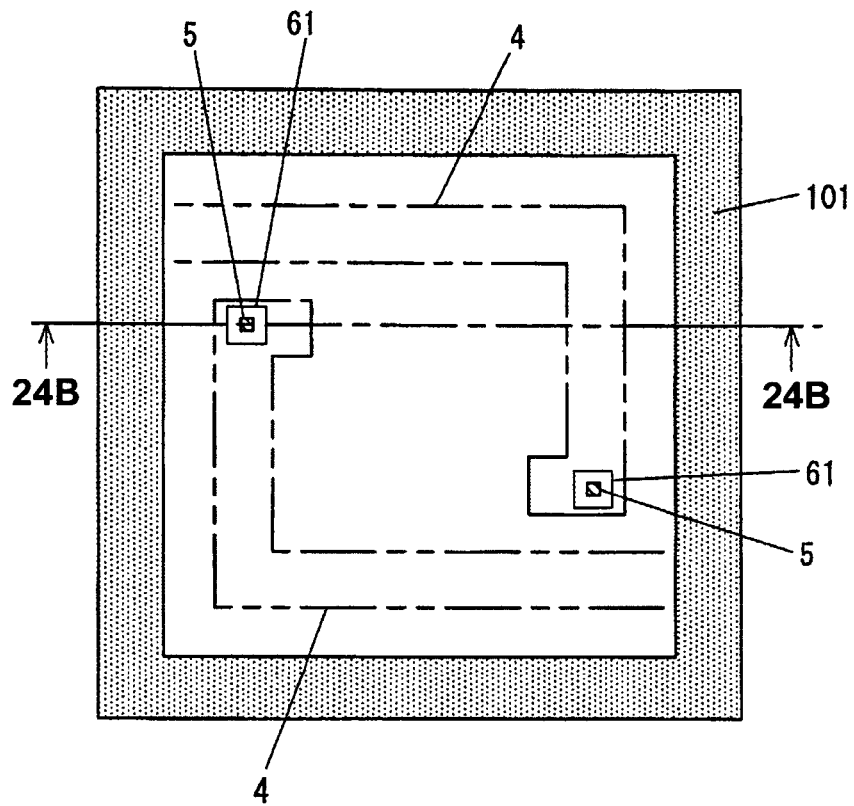
FIG. 24A is a simplified cross-sectional view showing a ninth step in manufacturing the infrared detection element of the seventh modification of the present invention as seen along section line 24B-24B in FIG. 24B.
Figure 24B:
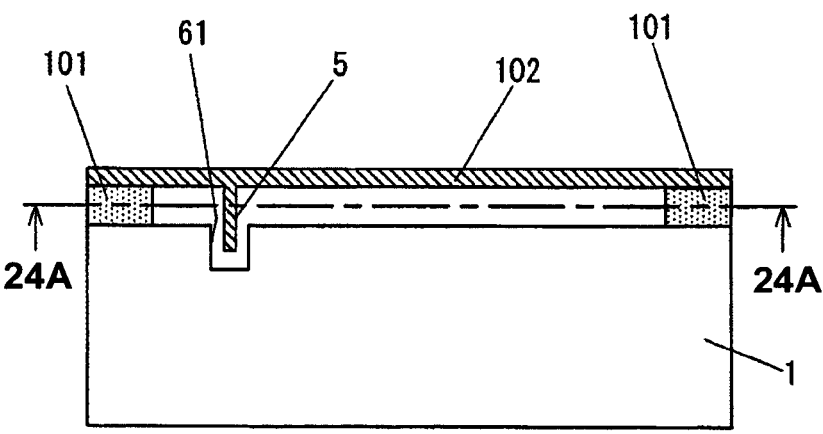
FIG. 24B is a simplified cross-sectional view showing the ninth step in manufacturing the infrared detection element of the seventh modification of the present invention as seen along section line 24-24 in FIG. 24A.

In the step shown in FIG. 24, boron or another material is ion-implanted into the peripheral part of the etching sacrifice layer 100, thereby forming the etching stopper 101. Next, a silicon nitride film or other insulating film 102 is formed, and the insulating film 102 deposited in the holes 62 forms the protuberance 5. The manufacturing process is thereafter the same as the process for manufacturing the infrared detection element shown in FIG. 1 (see FIGS. 5 through 7), and a description thereof shall accordingly be omitted. In FIG. 24, FIG. 24B shows a cross section of the substrate along 24B-24B, and FIG. 24A shows a cross section along 24A-24A in FIG. 24B.

Figure 25A:
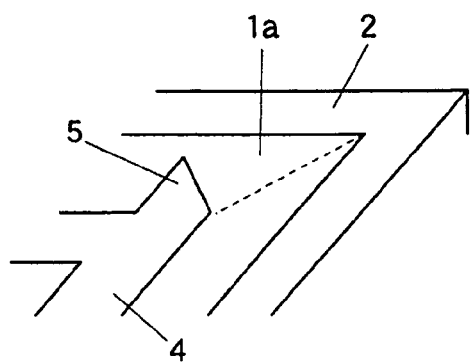
FIG. 25A is a simplified, enlarged perspective view of a distal end of the protuberance in accordance with one modification of the present invention.
Figure 25B:
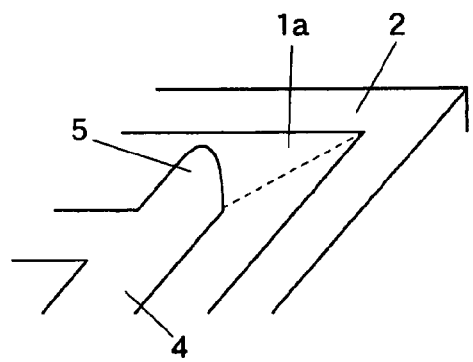
FIG. 25B is a simplified, enlarged perspective view of a distal end of the protuberance in accordance with another modification of the present invention.
Figure 25C:
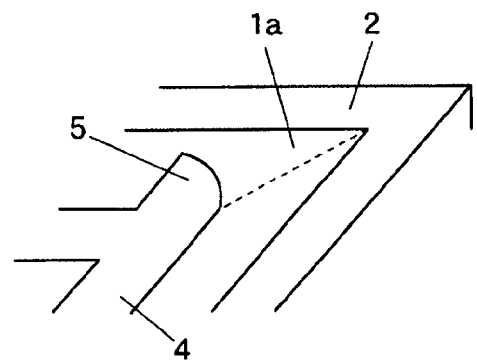
FIG. 25C is a simplified, enlarged perspective view of a distal end of the protuberance in accordance with still another modification of the present invention.

FIGS. 25A through 25D illustrate several diagrams showing various shapes of distal ends of the protuberances 5 of the present invention. In FIG. 25A, the distal end of the protuberance is triangular, whereby the area of the portion where the protuberance 5 and the surface defining the concavity 1a or the frame 2 come into contact is minimized, thereby enabling the sensitivity of the detection element due to this contact to minimally decrease. In the example shown in FIG. 25B, the distal end of the protuberance is arched, whereby damage to the distal end of the protuberance due to contact between the protuberance 5 and the surface defining the concavity 1a or the frame 2 is prevented. In the example shown in FIG. 25C, the distal end of the protuberance is curved in the shape of a knife or other type of blade, whereby the surface area of the contacting portion during bending of the beam 4 will correspond to the degree of bending of the beam 4, and the protuberance 5 is less likely to be damaged.

Figure 25D:
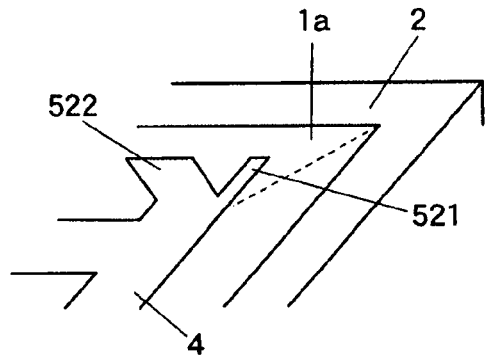
FIG. 25D is a simplified, enlarged perspective view of a distal end of the protuberance in accordance with yet still another modification of the present invention.

In the example shown in FIG. 25D, the protuberance 5 is bifurcated so as to have a thick portion 522 and a thin portion 521. The structure allows the thin portion 521 to make contact first when the beam 4 bends toward the surface defining the concavity 1a or the frame 2. When the light receiver 3 is displaced toward the concavity 1a, the thin portion 521 is initially supported by making contact with the concavity 1a. If a supporting limit of the thin portion 521 is exceeded, the thick portion 522 will make contact with the concavity 1a and will be supported.

As described above, the protuberance 5 that comes into contact with the surface defining the concavity 1a or the frame 2, and the light receiver 3 and the beams 4 are supported by the protuberance 5 upon being displaced. Therefore, the surface area of the contacting portion can be made smaller than in the prior art, and the detection performance of the detection element resulting from this contact can be prevented from declining. In addition, excessive bending of the beam 4 can be prevented, and damage to the beam 4 can be avoided.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Accordingly, these terms, as utilized to describe the present invention should be interpreted relative to a vehicle equipped with the present invention. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An infrared detection element comprising:
 a substrate structure having a substrate portion and a frame portion;

a light receiver configured and arranged to receive infrared rays, the light receiver having a peripheral edge around which the frame portion is at least partially disposed;

at least one beam having one end fixed to the frame portion and another end fixed to the light receiver to support the light receiver above the substrate structure, such that the light receiver is disposed higher than the frame portion relative to a thickness direction of the substrate structure; and at least one protuberance being provided on at least one of the frame portion, the light receiver and the beam with the at least one protuberance protruding in a direction transverse to the thickness direction of the substrate structure to limit direct contact between any two of the beam, the light receiver and the frame portion during bending of the beam, except at the at least one protuberance.

2. The infrared detection element according to claim 1, wherein
the at least one protuberance has a distal end with at least one of a triangular shaped tip, an arched shaped tip and curved shaped tip.

3. The infrared detection element according to claim 1, wherein
the substrate structure includes a substrate space with the light receiver being supported above the substrate space.

4. The infrared detection element according to claim 3, wherein
the at least one protuberance protrudes from one of the beam and the light receiver toward the substrate space in the direction transverse to the thickness direction of the substrate structure.

5. The infrared detection element according to claims 3, wherein
the at least one protuberance protrudes from the substrate structure adjacent to a peripheral area of the substrate space.

6. The infrared detection element according to claim 5, wherein
the light receiver is positioned higher than the at least one protuberance provided on the substrate structure relative to the thickness direction of the substrate structure.

7. The infrared detection element according to claim 3, wherein
the beam is formed between the light receiver and the substrate structure adjacent a peripheral area of the substrate space; and
the at least one protuberance comprises
a first protuberance provided on the substrate structure to protrude from the substrate structure towards the beam adjacent the peripheral area of the substrate space; and
a second protuberance provided on the beam adjacent the first protuberance to protrude from the beam towards the substrate structure adjacent the peripheral area of the substrate space.

8. The infrared detection element according to claim 3, wherein
the substrate space is a concavity with a (100) plane of a silicon crystal forming a surface of a substrate of the substrate structure and a (111) plane of the silicon crystal being exposed.

9. The infrared detection element according to claim 1, the at least one protuberance being disposed outside the peripheral edge of the light receiver.

10. An infrared detection element comprising:
a substrate structure;
a light receiver configured and arranged to receive infrared rays;
at least one beam having one end fixed to the substrate structure and another end fixed to the light receiver to support the light receiver above the substrate structure, the beam extending along a gap provided between the light receiver and the substrate structure on a peripheral area of the substrate space; and
at least one protuberance being provided on at least one of the substrate structure, the light receiver and the beam with the at least one protuberance being configured to limit direct contact between any two of the beam, the light receiver and the substrate structure during bending of the beam, except at the at least one protuberance, the at least one protuberance comprising
a first protuberance provided on the light receiver to protrude from the light receiver towards the beam; and
a second protuberance provided on the beam adjacent the first protuberance to protrude from the beam towards the light receiver.

11. The infrared detection element according to claim 10, wherein
the first and second protuberances overlap vertically across the gap relative to the thickness direction of the substrate structure.

12. The infrared detection element according to claim 11, wherein the at least one protuberance further comprises
a third protuberance provided on the light receiver to protrude from the light receiver towards the beam; and
a fourth protuberance provided on the beam adjacent the third protuberance to protrude from the beam towards the light receiver, with the third and fourth protuberances overlapping vertically across the gap relative to the thickness direction of the substrate, the second protuberance being located nearer to the substrate structure than the first protuberance, and the third protuberance being located nearer to the substrate structure than the fourth protuberance.

13. An infrared detection element comprising:
substrate means for forming a substrate structure having a substrate portion and a frame portion;
light receiving means for receiving infrared rays, the light receiving means having a peripheral edge around which the frame portion is at least partially disposed;
supporting means for suspending the light receiving means above the substrate means, such that the light receiving means is disposed higher than the frame portion relative to a thickness direction of the substrate structure; and
movement restricting means protruding in a direction transverse to the thickness direction of the substrate structure for limiting direct contact between any two of the supporting means, the light receiving means and the frame portion during bending of the supporting means, except for contact with the movement restricting means.

* * * * *